United States Patent
Svendsen

(10) Patent No.: US 8,484,227 B2
(45) Date of Patent: *Jul. 9, 2013

(54) CACHING AND SYNCHING PROCESS FOR A MEDIA SHARING SYSTEM

(75) Inventor: Hugh Svendsen, Chapel Hill, NC (US)

(73) Assignee: Eloy Technology, LLC, Porthsmouth, NH (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/251,513

(22) Filed: Oct. 15, 2008

(65) Prior Publication Data

US 2010/0094833 A1    Apr. 15, 2010

(51) Int. Cl.
*G06F 17/30* (2006.01)

(52) U.S. Cl.
USPC ........... 707/752; 707/753; 707/754; 707/748; 707/705; 707/736; 707/781; 709/203; 709/205; 709/225; 709/227

(58) Field of Classification Search
USPC .. 707/752–754, 748, 705, 736, 781; 709/205, 709/225, 227, 203; 705/10
See application file for complete search history.

(56) References Cited

U.S. PATENT DOCUMENTS

| | | |
|---|---|---|
| 4,870,579 A | 9/1989 | Hey |
| 5,544,313 A | 8/1996 | Shachnai et al. |
| 5,621,456 A | 4/1997 | Florin et al. |
| 5,621,546 A | 4/1997 | Klassen et al. |
| 5,771,778 A | 6/1998 | MacLean, IV |
| 5,956,027 A | 9/1999 | Krishnamurthy |
| 5,963,916 A | 10/1999 | Kaplan |
| 6,134,552 A | 10/2000 | Fritz et al. |
| 6,195,657 B1 | 2/2001 | Rucker et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |

(Continued)

FOREIGN PATENT DOCUMENTS

| | | |
|---|---|---|
| CN | 1208930 | 2/1999 |
| CN | 1395794 A | 2/2003 |

(Continued)

OTHER PUBLICATIONS

"DNS Service Discovery (DNS-SD)," http://www.dns-sd.org/, printed May 18, 2010, 4 pages.

(Continued)

*Primary Examiner* — Frantz Coby

(57) ABSTRACT

A system and method for caching and/or synching shared media items in a media sharing system are provided. In one embodiment, a user device of a user joins a media sharing system including the user device and one or more other user devices connected via a network such that the user of the user device has access to one or more shared media collections hosted by the one or more other user devices. Shared media items from the one or more shared media collections are scored. The user device then obtains shared media items scored above a defined threshold from the one or more other user devices hosting the one or more corresponding shared media collections and stores those shared media items in local storage. In one embodiment, the local storage is temporary storage, such as a cache.

25 Claims, 24 Drawing Sheets

U.S. PATENT DOCUMENTS

| | | | |
|---|---|---|---|
| 6,466,980 B1 | 10/2002 | Lumelsky et al. | |
| 6,498,955 B1 | 12/2002 | McCarthy et al. | |
| 6,526,411 B1 | 2/2003 | Ward | |
| 6,567,797 B1 | 5/2003 | Schuetze et al. | |
| 6,587,127 B1 | 7/2003 | Leeke et al. | |
| 6,587,850 B2 | 7/2003 | Zhai | |
| 6,615,208 B1 | 9/2003 | Behrens et al. | |
| 6,629,104 B1 | 9/2003 | Parulski et al. | |
| 6,633,903 B1 | 10/2003 | Gould | |
| 6,636,836 B1 | 10/2003 | Pyo | |
| 6,654,786 B1 | 11/2003 | Fox et al. | |
| 6,662,231 B1 | 12/2003 | Drosset et al. | |
| 6,670,537 B2 | 12/2003 | Hughes et al. | |
| 6,694,482 B1 | 2/2004 | Arellano et al. | |
| 6,714,215 B1 | 3/2004 | Flora et al. | |
| 6,728,760 B1 | 4/2004 | Fairchild et al. | |
| 6,757,517 B2 | 6/2004 | Chang | |
| 6,757,691 B1 | 6/2004 | Welsh et al. | |
| 6,801,909 B2 | 10/2004 | Delgado et al. | |
| 6,865,565 B2 | 3/2005 | Rainsberger et al. | |
| 6,886,035 B2 | 4/2005 | Wolff | |
| 6,904,264 B1 | 6/2005 | Frantz | |
| 6,907,458 B2 | 6/2005 | Tomassetti et al. | |
| 6,912,528 B2 | 6/2005 | Homer | |
| 6,920,281 B1 | 7/2005 | Agnibotri et al. | |
| 6,941,275 B1 | 9/2005 | Swierczek | |
| 6,941,324 B2 | 9/2005 | Plastina et al. | |
| 6,947,922 B1 | 9/2005 | Glance | |
| 6,953,886 B1 | 10/2005 | Looney et al. | |
| 6,954,790 B2 * | 10/2005 | Forslow | 709/227 |
| 6,976,228 B2 | 12/2005 | Bernhardson | |
| 6,987,221 B2 | 1/2006 | Platt | |
| 6,990,453 B2 | 1/2006 | Wang et al. | |
| 6,993,532 B1 | 1/2006 | Platt et al. | |
| 7,013,301 B2 | 3/2006 | Holm et al. | |
| 7,024,424 B1 | 4/2006 | Platt et al. | |
| 7,035,871 B2 | 4/2006 | Hunt et al. | |
| 7,047,406 B2 | 5/2006 | Schleicher et al. | |
| 7,072,846 B1 | 7/2006 | Robinson | |
| 7,072,886 B2 | 7/2006 | Salmenkaita et al. | |
| 7,075,000 B2 | 7/2006 | Gang et al. | |
| 7,089,248 B1 | 8/2006 | King et al. | |
| 7,096,234 B2 | 8/2006 | Plastina et al. | |
| 7,103,645 B2 | 9/2006 | Leighton et al. | |
| 7,113,999 B2 | 9/2006 | Pestoni et al. | |
| 7,117,266 B2 | 10/2006 | Fishman et al. | |
| 7,120,619 B2 | 10/2006 | Drucker et al. | |
| 7,139,757 B1 | 11/2006 | Apollonsky et al. | |
| 7,171,174 B2 | 1/2007 | Ellis et al. | |
| 7,177,872 B2 | 2/2007 | Schwesig et al. | |
| 7,197,490 B1 | 3/2007 | English | |
| 7,197,557 B1 | 3/2007 | Asar et al. | |
| 7,222,187 B2 | 5/2007 | Yeager et al. | |
| 7,283,992 B2 | 10/2007 | Liu et al. | |
| 7,296,031 B1 | 11/2007 | Platt et al. | |
| 7,296,032 B1 | 11/2007 | Beddow | |
| 7,313,571 B1 | 12/2007 | Platt et al. | |
| 7,333,092 B2 | 2/2008 | Zadesky et al. | |
| 7,340,481 B1 | 3/2008 | Baer et al. | |
| 7,363,361 B2 | 4/2008 | Tewari et al. | |
| 7,373,144 B1 | 5/2008 | Kirkpatrick et al. | |
| 7,373,644 B2 | 5/2008 | Aborn | |
| 7,426,537 B2 | 9/2008 | Lee et al. | |
| 7,437,364 B1 | 10/2008 | Fredricksen et al. | |
| 7,463,890 B2 | 12/2008 | Herz et al. | |
| 7,483,958 B1 | 1/2009 | Elabbady et al. | |
| 7,496,623 B2 | 2/2009 | Szeto et al. | |
| 7,509,291 B2 | 3/2009 | McBride et al. | |
| 7,548,915 B2 | 6/2009 | Ramer et al. | |
| 7,548,934 B1 | 6/2009 | Platt et al. | |
| 7,590,546 B2 | 9/2009 | Chuang | |
| 7,594,246 B1 | 9/2009 | Billmaier et al. | |
| 7,614,006 B2 | 11/2009 | Molander | |
| 7,636,509 B2 | 12/2009 | Davis | |
| 7,668,939 B2 | 2/2010 | Encarnacion et al. | |
| 7,676,753 B2 | 3/2010 | Bedingfield | |
| 7,680,814 B2 | 3/2010 | Mercer et al. | |
| 7,680,959 B2 | 3/2010 | Svendsen | |
| 7,685,210 B2 | 3/2010 | Plastina et al. | |
| 7,689,510 B2 | 3/2010 | Lamkin et al. | |
| 7,696,427 B2 | 4/2010 | West et al. | |
| 7,702,728 B2 | 4/2010 | Zaner et al. | |
| 7,720,871 B2 | 5/2010 | Rogers et al. | |
| 7,730,216 B1 | 6/2010 | Issa et al. | |
| 7,747,620 B2 | 6/2010 | Beaupre | |
| 7,752,265 B2 * | 7/2010 | Svendsen et al. | 709/205 |
| 7,779,097 B2 | 8/2010 | Lamkin et al. | |
| 7,792,756 B2 | 9/2010 | Plastina et al. | |
| 7,805,129 B1 | 9/2010 | Issa et al. | |
| 7,840,620 B2 | 11/2010 | Vignoli et al. | |
| 7,853,712 B2 | 12/2010 | Amidon et al. | |
| 8,059,646 B2 | 11/2011 | Svendsen et al. | |
| 8,224,899 B2 * | 7/2012 | Svendsen et al. | 709/204 |
| 8,285,810 B2 * | 10/2012 | Svendsen et al. | 709/217 |
| 8,285,811 B2 * | 10/2012 | Svendsen et al. | 709/217 |
| 8,321,449 B2 * | 11/2012 | Tan | 707/767 |
| 2001/0013009 A1 | 8/2001 | Greening et al. | |
| 2001/0025259 A1 | 9/2001 | Rouchon | |
| 2002/0029384 A1 | 3/2002 | Griggs | |
| 2002/0052207 A1 | 5/2002 | Hunzinger | |
| 2002/0069278 A1 * | 6/2002 | Forslow | 709/225 |
| 2002/0082901 A1 | 6/2002 | Dunning et al. | |
| 2002/0087382 A1 | 7/2002 | Tiburcio | |
| 2002/0103796 A1 | 8/2002 | Hartley | |
| 2002/0108112 A1 | 8/2002 | Wallace et al. | |
| 2002/0116533 A1 | 8/2002 | Holliman et al. | |
| 2002/0138836 A1 | 9/2002 | Zimmerman | |
| 2002/0165793 A1 | 11/2002 | Brand et al. | |
| 2002/0178057 A1 | 11/2002 | Bertram et al. | |
| 2003/0001907 A1 | 1/2003 | Bergsten et al. | |
| 2003/0005074 A1 | 1/2003 | Herz et al. | |
| 2003/0014407 A1 | 1/2003 | Blatter et al. | |
| 2003/0018799 A1 | 1/2003 | Eyal | |
| 2003/0032419 A1 | 2/2003 | Shibasaki et al. | |
| 2003/0037157 A1 | 2/2003 | Pestoni et al. | |
| 2003/0046399 A1 | 3/2003 | Boulter et al. | |
| 2003/0055516 A1 | 3/2003 | Gang et al. | |
| 2003/0055657 A1 | 3/2003 | Yoshida et al. | |
| 2003/0066068 A1 | 4/2003 | Gutta et al. | |
| 2003/0069806 A1 | 4/2003 | Konomi et al. | |
| 2003/0093790 A1 | 5/2003 | Logan et al. | |
| 2003/0097186 A1 | 5/2003 | Gutta et al. | |
| 2003/0110510 A1 | 6/2003 | Gong et al. | |
| 2003/0115167 A1 | 6/2003 | Sharif et al. | |
| 2003/0135513 A1 | 7/2003 | Quinn et al. | |
| 2003/0149581 A1 | 8/2003 | Chaudhri et al. | |
| 2003/0149612 A1 | 8/2003 | Berghofer et al. | |
| 2003/0153338 A1 | 8/2003 | Herz et al. | |
| 2003/0160770 A1 | 8/2003 | Zimmerman | |
| 2003/0167295 A1 | 9/2003 | Choo | |
| 2003/0191753 A1 | 10/2003 | Hoch | |
| 2003/0212804 A1 | 11/2003 | Hashemi | |
| 2003/0227478 A1 | 12/2003 | Chatfield | |
| 2003/0236582 A1 | 12/2003 | Zamir et al. | |
| 2003/0237093 A1 | 12/2003 | Marsh | |
| 2004/0003392 A1 | 1/2004 | Trajkovic et al. | |
| 2004/0019497 A1 | 1/2004 | Volk et al. | |
| 2004/0034441 A1 | 2/2004 | Eaton et al. | |
| 2004/0073919 A1 | 4/2004 | Gutta | |
| 2004/0088271 A1 | 5/2004 | Cleckler | |
| 2004/0091235 A1 | 5/2004 | Gutta | |
| 2004/0107821 A1 | 6/2004 | Alcalde et al. | |
| 2004/0128286 A1 | 7/2004 | Yasushi et al. | |
| 2004/0133657 A1 | 7/2004 | Smith et al. | |
| 2004/0133908 A1 | 7/2004 | Smith et al. | |
| 2004/0133914 A1 | 7/2004 | Smith et al. | |
| 2004/0162783 A1 | 8/2004 | Gross | |
| 2004/0162830 A1 | 8/2004 | Shirwadkar et al. | |
| 2004/0181540 A1 | 9/2004 | Jung et al. | |
| 2004/0186733 A1 | 9/2004 | Loomis et al. | |
| 2004/0199527 A1 | 10/2004 | Morain et al. | |
| 2004/0215793 A1 | 10/2004 | Ryan et al. | |
| 2004/0216108 A1 | 10/2004 | Robbin | |
| 2004/0224638 A1 | 11/2004 | Fadell et al. | |
| 2004/0252604 A1 | 12/2004 | Johnson et al. | |
| 2004/0254911 A1 | 12/2004 | Grasso et al. | |
| 2004/0267604 A1 | 12/2004 | Gross | |

| | | | | | |
|---|---|---|---|---|---|
| 2005/0021420 A1 | 1/2005 | Michelitsch et al. | 2006/0265467 A1 | 11/2006 | Jang |
| 2005/0021678 A1 | 1/2005 | Simyon et al. | 2006/0265503 A1 | 11/2006 | Jones et al. |
| 2005/0026559 A1 | 2/2005 | Khedouri | 2006/0265637 A1 | 11/2006 | Marriott et al. |
| 2005/0038819 A1 | 2/2005 | Hicken et al. | 2006/0271959 A1 | 11/2006 | Jacoby et al. |
| 2005/0038876 A1 | 2/2005 | Chaudhuri | 2006/0271961 A1 | 11/2006 | Jacoby et al. |
| 2005/0060264 A1 | 3/2005 | Schrock et al. | 2006/0273155 A1 | 12/2006 | Thackston |
| 2005/0060666 A1 | 3/2005 | Hoshino et al. | 2006/0277098 A1 | 12/2006 | Chung et al. |
| 2005/0091107 A1 | 4/2005 | Blum | 2006/0282304 A1 | 12/2006 | Bedard et al. |
| 2005/0120053 A1 | 6/2005 | Watson | 2006/0282776 A1 | 12/2006 | Farmer et al. |
| 2005/0125222 A1 | 6/2005 | Brown et al. | 2006/0282856 A1 | 12/2006 | Errico et al. |
| 2005/0131866 A1 | 6/2005 | Badros et al. | 2006/0288041 A1 | 12/2006 | Plastina et al. |
| 2005/0149480 A1 | 7/2005 | Deshpande | 2006/0293909 A1 | 12/2006 | Miyajima et al. |
| 2005/0149508 A1 | 7/2005 | Deshpande | 2007/0005793 A1 | 1/2007 | Miyoshi et al. |
| 2005/0154608 A1 | 7/2005 | Paulson et al. | 2007/0014536 A1 | 1/2007 | Hellman |
| 2005/0154764 A1 | 7/2005 | Riegler et al. | 2007/0022437 A1 | 1/2007 | Gerken |
| 2005/0154767 A1 | 7/2005 | Sako | 2007/0025194 A1 | 2/2007 | Morse et al. |
| 2005/0158028 A1 | 7/2005 | Koba | 2007/0028171 A1 | 2/2007 | MacLaurin |
| 2005/0166245 A1 | 7/2005 | Shin et al. | 2007/0031109 A1 | 2/2007 | Tsuboi et al. |
| 2005/0197961 A1 | 9/2005 | Miller et al. | 2007/0033225 A1 | 2/2007 | Davis |
| 2005/0212767 A1* | 9/2005 | Marvit et al. ............ 345/158 | 2007/0038647 A1 | 2/2007 | Thomas et al. |
| 2005/0228830 A1 | 10/2005 | Plastina et al. | 2007/0043766 A1 | 2/2007 | Nicholas et al. |
| 2005/0240494 A1 | 10/2005 | Cue et al. | 2007/0044010 A1 | 2/2007 | Sull et al. |
| 2005/0246391 A1 | 11/2005 | Gross | 2007/0048713 A1 | 3/2007 | Plastina et al. |
| 2005/0251455 A1 | 11/2005 | Boesen | 2007/0048714 A1 | 3/2007 | Plastina et al. |
| 2005/0251565 A1 | 11/2005 | Weel | 2007/0061416 A1 | 3/2007 | Gould |
| 2005/0251576 A1 | 11/2005 | Weel | 2007/0064626 A1 | 3/2007 | Evans |
| 2005/0251807 A1 | 11/2005 | Weel | 2007/0078714 A1 | 4/2007 | Ott, IV et al. |
| 2005/0256756 A1 | 11/2005 | Lam et al. | 2007/0078832 A1 | 4/2007 | Ott, IV et al. |
| 2005/0256866 A1 | 11/2005 | Lu et al. | 2007/0079352 A1 | 4/2007 | Klein, Jr. |
| 2005/0262246 A1 | 11/2005 | Menon et al. | 2007/0083471 A1 | 4/2007 | Robbin et al. |
| 2005/0267944 A1 | 12/2005 | Little, II | 2007/0083553 A1 | 4/2007 | Minor |
| 2005/0278377 A1 | 12/2005 | Mirrashidi et al. | 2007/0083556 A1 | 4/2007 | Plastina et al. |
| 2005/0278758 A1 | 12/2005 | Bodlaender | 2007/0094081 A1 | 4/2007 | Yruski et al. |
| 2005/0286546 A1 | 12/2005 | Bassoli et al. | 2007/0094082 A1 | 4/2007 | Yruski et al. |
| 2006/0004704 A1 | 1/2006 | Gross | 2007/0094083 A1 | 4/2007 | Yruski et al. |
| 2006/0008256 A1 | 1/2006 | Khedouri et al. | 2007/0094363 A1 | 4/2007 | Yruski et al. |
| 2006/0010167 A1 | 1/2006 | Grace et al. | 2007/0100904 A1 | 5/2007 | Casey et al. |
| 2006/0015378 A1 | 1/2006 | Mirrashidi et al. | 2007/0106672 A1 | 5/2007 | Sighart et al. |
| 2006/0020662 A1 | 1/2006 | Robinson | 2007/0106693 A1 | 5/2007 | Houh et al. |
| 2006/0026048 A1 | 2/2006 | Kolawa et al. | 2007/0118425 A1 | 5/2007 | Yruski et al. |
| 2006/0044466 A1 | 3/2006 | Kelly et al. | 2007/0118657 A1 | 5/2007 | Kreitzer et al. |
| 2006/0048059 A1 | 3/2006 | Etkin | 2007/0118802 A1 | 5/2007 | Gerace et al. |
| 2006/0064716 A1 | 3/2006 | Sull et al. | 2007/0118853 A1 | 5/2007 | Kreitzer et al. |
| 2006/0069998 A1 | 3/2006 | Artman et al. | 2007/0118873 A1 | 5/2007 | Houh et al. |
| 2006/0074750 A1 | 4/2006 | Clark et al. | 2007/0130008 A1 | 6/2007 | Brown et al. |
| 2006/0083119 A1 | 4/2006 | Hayes | 2007/0130012 A1 | 6/2007 | Yruski et al. |
| 2006/0085383 A1 | 4/2006 | Mantle et al. | 2007/0152502 A1 | 7/2007 | Kinsey et al. |
| 2006/0100924 A1 | 5/2006 | Tevanian, Jr. | 2007/0162502 A1 | 7/2007 | Thomas et al. |
| 2006/0126135 A1 | 6/2006 | Stevens et al. | 2007/0168544 A1 | 7/2007 | Sciammarella |
| 2006/0130120 A1 | 6/2006 | Brandyberry et al. | 2007/0168554 A1 | 7/2007 | Dinger et al. |
| 2006/0143236 A1 | 6/2006 | Wu | 2007/0198485 A1 | 8/2007 | Ramer et al. |
| 2006/0167956 A1 | 7/2006 | Chasen et al. | 2007/0199014 A1 | 8/2007 | Clark et al. |
| 2006/0167991 A1 | 7/2006 | Heikes et al. | 2007/0214182 A1 | 9/2007 | Rosenberg |
| 2006/0173910 A1 | 8/2006 | McLaughlin | 2007/0214259 A1 | 9/2007 | Ahmed et al. |
| 2006/0174277 A1 | 8/2006 | Sezan et al. | 2007/0220081 A1 | 9/2007 | Hyman |
| 2006/0179078 A1 | 8/2006 | McLean | 2007/0233736 A1 | 10/2007 | Xiong et al. |
| 2006/0190616 A1 | 8/2006 | Mayerhofer et al. | 2007/0238427 A1 | 10/2007 | Kraft et al. |
| 2006/0195479 A1 | 8/2006 | Spiegelman et al. | 2007/0239724 A1 | 10/2007 | Ramer et al. |
| 2006/0195512 A1 | 8/2006 | Rogers et al. | 2007/0239778 A1 | 10/2007 | Gallagher |
| 2006/0195515 A1 | 8/2006 | Beaupre et al. | 2007/0244856 A1 | 10/2007 | Plastina et al. |
| 2006/0195521 A1 | 8/2006 | New et al. | 2007/0244880 A1 | 10/2007 | Martin et al. |
| 2006/0195789 A1 | 8/2006 | Rogers et al. | 2007/0245245 A1 | 10/2007 | Blue et al. |
| 2006/0195790 A1 | 8/2006 | Beaupre et al. | 2007/0264982 A1 | 11/2007 | Nguyen et al. |
| 2006/0195902 A1 | 8/2006 | King et al. | 2007/0265870 A1 | 11/2007 | Song et al. |
| 2006/0200435 A1 | 9/2006 | Flinn et al. | 2007/0266001 A1 | 11/2007 | Williams et al. |
| 2006/0206582 A1 | 9/2006 | Finn | 2007/0269169 A1 | 11/2007 | Stix et al. |
| 2006/0212478 A1 | 9/2006 | Plastina et al. | 2007/0276826 A1 | 11/2007 | Chand et al. |
| 2006/0218187 A1 | 9/2006 | Plastina et al. | 2007/0277202 A1 | 11/2007 | Lin et al. |
| 2006/0218613 A1 | 9/2006 | Bushnell | 2007/0282949 A1 | 12/2007 | Fischer et al. |
| 2006/0224757 A1 | 10/2006 | Fang et al. | 2007/0288546 A1 | 12/2007 | Rosenberg |
| 2006/0227673 A1 | 10/2006 | Yamashita et al. | 2007/0299681 A1 | 12/2007 | Plastina et al. |
| 2006/0242106 A1 | 10/2006 | Bank | 2007/0299873 A1 | 12/2007 | Jones et al. |
| 2006/0242201 A1 | 10/2006 | Cobb et al. | 2007/0299874 A1 | 12/2007 | Neumann et al. |
| 2006/0245367 A1 | 11/2006 | Jeffery et al. | 2007/0299978 A1 | 12/2007 | Neumann et al. |
| 2006/0248209 A1 | 11/2006 | Chiu et al. | 2008/0005179 A1 | 1/2008 | Friedman et al. |
| 2006/0253417 A1 | 11/2006 | Brownrigg et al. | 2008/0010372 A1 | 1/2008 | Khedouri et al. |
| 2006/0259355 A1 | 11/2006 | Farouki et al. | 2008/0016098 A1 | 1/2008 | Frieden et al. |
| 2006/0265349 A1 | 11/2006 | Hicken | 2008/0016205 A1 | 1/2008 | Svendsen |
| 2006/0265409 A1 | 11/2006 | Neumann et al. | 2008/0032723 A1 | 2/2008 | Rosenberg |

| | | |
|---|---|---|
| 2008/0033959 A1 | 2/2008 | Jones |
| 2008/0040313 A1 | 2/2008 | Schachter |
| 2008/0046948 A1 | 2/2008 | Verosub |
| 2008/0052349 A1 | 2/2008 | Lin |
| 2008/0052371 A1 | 2/2008 | Partovi et al. |
| 2008/0052630 A1 | 2/2008 | Rosenbaum |
| 2008/0059576 A1 | 3/2008 | Liu et al. |
| 2008/0080392 A1 | 4/2008 | Walsh et al. |
| 2008/0091717 A1 | 4/2008 | Garbow et al. |
| 2008/0091771 A1 | 4/2008 | Allen et al. |
| 2008/0104122 A1 | 5/2008 | Hempleman et al. |
| 2008/0120501 A1 | 5/2008 | Jannink et al. |
| 2008/0132175 A1 | 6/2008 | Loeb et al. |
| 2008/0133441 A1 | 6/2008 | West et al. |
| 2008/0133601 A1 | 6/2008 | Martin Cervera et al. |
| 2008/0133759 A1 | 6/2008 | Weel |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147798 A1 | 6/2008 | Paalasmaa et al. |
| 2008/0154798 A1 | 6/2008 | Valz |
| 2008/0154967 A1 | 6/2008 | Heikes et al. |
| 2008/0155057 A1 | 6/2008 | Khedouri et al. |
| 2008/0176511 A1 | 7/2008 | Tan et al. |
| 2008/0189336 A1 | 8/2008 | Prihodko |
| 2008/0189391 A1 | 8/2008 | Koberstein et al. |
| 2008/0189617 A1 | 8/2008 | Covell et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0205205 A1 | 8/2008 | Chiang et al. |
| 2008/0222188 A1 | 9/2008 | Watson et al. |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0256032 A1 | 10/2008 | Vignoli et al. |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0019156 A1 | 1/2009 | Mo et al. |
| 2009/0037005 A1 | 2/2009 | Larsen et al. |
| 2009/0042545 A1 | 2/2009 | Avital et al. |
| 2009/0055385 A1 | 2/2009 | Jeon et al. |
| 2009/0055467 A1 | 2/2009 | Petersen |
| 2009/0060467 A1 | 3/2009 | Grigsby et al. |
| 2009/0063975 A1 | 3/2009 | Bull et al. |
| 2009/0069911 A1 | 3/2009 | Stefik |
| 2009/0069912 A1 | 3/2009 | Stefik |
| 2009/0070350 A1 | 3/2009 | Wang |
| 2009/0070438 A1 | 3/2009 | Bartholomew |
| 2009/0077124 A1 | 3/2009 | Spivack et al. |
| 2009/0080635 A1 | 3/2009 | Altberg et al. |
| 2009/0083117 A1 | 3/2009 | Svendsen et al. |
| 2009/0083541 A1 | 3/2009 | Levine |
| 2009/0089288 A1 | 4/2009 | Petersen |
| 2009/0094317 A1 | 4/2009 | Venkitaraman |
| 2009/0129671 A1 | 5/2009 | Hu et al. |
| 2009/0132527 A1 | 5/2009 | Sheshagiri et al. |
| 2009/0138505 A1 | 5/2009 | Purdy |
| 2009/0164199 A1 | 6/2009 | Amidon et al. |
| 2009/0164452 A1 | 6/2009 | Yogaratnam et al. |
| 2009/0164600 A1 | 6/2009 | Issa et al. |
| 2009/0164641 A1 | 6/2009 | Rogers et al. |
| 2009/0165356 A1 | 7/2009 | Blum |
| 2009/0177301 A1 | 7/2009 | Hayes |
| 2009/0177654 A1 | 7/2009 | Beaupre et al. |
| 2009/0193338 A1 | 7/2009 | Fiatal |
| 2009/0216859 A1 | 8/2009 | Dolling |
| 2009/0217352 A1 | 8/2009 | Shen et al. |
| 2009/0222392 A1 | 9/2009 | Martin et al. |
| 2009/0249222 A1 | 10/2009 | Schmidt et al. |
| 2009/0254643 A1 | 10/2009 | Terheggen et al. |
| 2009/0265218 A1* | 10/2009 | Amini et al. ............ 705/10 |
| 2009/0265356 A1 | 10/2009 | Hyman et al. |
| 2009/0265416 A1* | 10/2009 | Svendsen et al. ........... 709/203 |
| 2009/0265417 A1* | 10/2009 | Svendsen et al. ........... 709/203 |
| 2009/0265418 A1* | 10/2009 | Svendsen et al. ........... 709/203 |
| 2009/0265426 A1* | 10/2009 | Svendsen et al. ........... 709/204 |
| 2009/0326970 A1 | 12/2009 | Estrada et al. |
| 2010/0023578 A1 | 1/2010 | Brant et al. |
| 2010/0037752 A1 | 2/2010 | Hansson et al. |
| 2010/0070490 A1 | 3/2010 | Amidon et al. |
| 2010/0070537 A1 | 3/2010 | Amidon et al. |
| 2010/0071070 A1 | 3/2010 | Jawa et al. |
| 2010/0082135 A1 | 4/2010 | Amidon et al. |
| 2010/0094834 A1 | 4/2010 | Svendsen |
| 2010/0094934 A1 | 4/2010 | Svendsen et al. |
| 2010/0094935 A1 | 4/2010 | Svendsen et al. |
| 2010/0107117 A1 | 4/2010 | Pearce et al. |
| 2010/0114979 A1 | 5/2010 | Petersen |
| 2010/0115553 A1 | 5/2010 | Van Flandern et al. |
| 2010/0134647 A1 | 6/2010 | Orboubadian |
| 2010/0198818 A1 | 8/2010 | Mclaughlin |
| 2011/0004840 A1 | 1/2011 | Feinberg et al. |
| 2011/0060994 A1 | 3/2011 | Maxwell et al. |
| 2011/0145327 A1 | 6/2011 | Stewart |
| 2011/0208831 A1 | 8/2011 | Ho et al. |
| 2012/0023430 A1 | 1/2012 | Amidon et al. |
| 2012/0259737 A1 | 10/2012 | Pousti et al. |

FOREIGN PATENT DOCUMENTS

| | | |
|---|---|---|
| CN | 1909633 A | 2/2007 |
| CN | 101021852 A | 8/2007 |
| CN | 101115019 A | 1/2008 |
| EP | 898278 | 2/1999 |
| EP | 1536352 | 6/2005 |
| EP | 1835455 | 9/2007 |
| GB | 2372850 | 9/2002 |
| GB | 2397205 | 7/2004 |
| JP | 2005321668 | 11/2005 |
| WO | WO 2001/084353 | 11/2001 |
| WO | WO 2002/021335 | 3/2002 |
| WO | WO 2004/017178 | 2/2004 |
| WO | WO 2004/043064 | 5/2004 |
| WO | WO 2005/026916 | 3/2005 |
| WO | WO 2005/071571 | 8/2005 |
| WO | WO 2006/075032 | 7/2006 |
| WO | WO 2006/126135 | 11/2006 |
| WO | 2007/069004 A1 | 6/2007 |
| WO | 2007092053 A1 | 8/2007 |
| WO | 2007137626 A1 | 12/2007 |

OTHER PUBLICATIONS

Tallberg, Mathias, "P2P-Based Roaming Between Home WLAN Hotspots," http://whitepapertechworld.com/wirelessnetworking-wlan-wi-fi/4587/p2p-based-roaming-between-home-wlan-hotspots/, Mar. 1, 2007, 6 pages.

Wu et al., "Next Generation Mobile Multimedia Communications: Media Codec and Media Transport Perspectives," China Communications, Oct. 2006, 15 pages.

Zahariadis et al., "Scalable Content Delivery Over P2P Convergent Networks," 12th IEEE International Symposium on Consumer Electronics, (ISCE 2008), Vilamoura, Portugal, (Apr. 14-16, 2008), 4 pages.

Yufeng Dou et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol. 1 (CIMCA-IAWTIC'06), vol. 1, pp. 951-956, 2005, 1 page.

"Firefly Media Server :: Home p.," fireflymediaserver.org/, printed Feb. 3, 2009, 1 page.

"Apple—iTunes—What is iTunes?—A player, a store, and more," apple.com/itunes/whatis/, printed Aug. 11, 2009, 2 pages.

"LimeWire User Manual," copyright 2000-2005 limewire, 24 pages.

Ripeanu et al, "Mapping the Gnutella Network: Properties of Large-Scale Peer-to-Peer Systems and Implications for System Design," University of Chicago, 2003, 12 pages.

"Celtius XDM Server," copyright 2007, Celtius Ltd., originally found at <http://www.celtius.connis.asp?p=494>, copy found at Internet Archive, dated Oct. 9, 2007, printed Apr. 28, 2011, 2 pages.

"FLUTE—File Delivery over Unidirectional Transport," Oct. 2004, copyright 2004, The Internet Society, at <http://tools.ietf.org/html/rfc3926>, printed Apr. 19, 2011, 36 pages.

Hua, K.A. et al., "Video Delivery Technologies for Large-Scale Deployment of Multimedia Applications," Proceedings of the IEEE, vol. 92, No. 9, Sep. 2004, pp. 1439-1451, 13 pages.

Kasenna, "Deploying Network-Based PVR Services," Sep. 2004, copyright 2004, Kasenna, Inc., found at <http://www.kasenna.com/downloads/white_papers/Kasenna_NPVR_TimelessTV_White_Paper.pdf>, pp. 1-12.

"RTP, Real-time Transport Protocol," at <http://www.networksorcery.com/enp/protocol/rtp.htm>, copyright 1998-2011, Network Sorcery, Inc., printed Apr. 19, 2011, 13 pages.

"How to Share Files in Windows XP," at <http://compnetworking.about.com/od/windo . . .>, from Internet Archive dated Mar. 31, 2006, printed Feb. 26, 2012, 2 pages.

"Microsoft Windows XP tutorial free. Unit 4 Windows Explorer," at <http://www.teacherclick.com/winxp/t_4_1.htm>, copyright Nov. 2005, aulaClic, printed Feb. 26, 2012, 4 pages.

"Amazon.com: Online Shopping for Electronics, Apparel, Computers, Books, DVDs & m . . .," at <http://www.amazon.com/>, copyright 1996-2007, Amazon.com, Inc., printed Oct. 26, 2007, 4 pages.

"Apple—iPod + iTunes," at <http://www.apple.com/itunes/>, copyright 2007 by Paramount Pictures, printed Feb. 7, 2007, 2 pages.

"Apple —iPod classic," at <http://www.apple.com/ipodclassic/>, printed Oct. 26, 2007, 1 page.

Barrie-Anthony, Steven, "That song sounds familiar," Los Angeles Times, Feb. 3, 2006, available from <http://www.calendarlive.com/printedition/calendar/cl-et-pandora3feb03,0,7458778.story?track=tottext,0,19432.story?track=tothtml>, printed Feb. 3, 2006, 5 pages.

"Better Propaganda—Free MP3s and music videos," at <http://www.betterpropaganda.com/>, copyright 2004-2005, betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

Cai, Rui et al., "Scalable Music Recommendation by Search," Proc. ACM Multimedia, Augsburg, Germany, Sep. 23-28, 2007, pp. 1065-1074.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestrearn°/020review%20of%2Opersonalization&sourc e=web&cd=1&ved=0CDcQFjAA&url=http°/03A%2P/02Fwww.behavioraltargetinginfo%2Fdownloadatt achment.ph0/03Fald%3Dcf74d490a8b97edd535b4ccdbfdOdf55%26articleld%3D31&ei=C2jeTr71Aur ZOQGCgsGvBw&usg=AFQjCNEBLn7jJCDh-VYty3h79uFKGFBkRw>, 13 pages.

"The Classic TV Database—Your Home for Classic TV! —www.classic-tv.com," http://www.classic-tv.com, copyright The Classic TV Database—www.classic-tv:com, printed Feb. 7, 2007, 3 pages.

Mascia, J. and Reddy, S., "cs219 Project Report—Lifetrak: Music in Tune With Your Life," Department of Electrical Engineering, UCLA '06, Los Angeles, California, copyright 2006, ACM, 11 pages.

Nealon, Andrew D., "The Daily Barometer—GenieLab.com grants music lovers' wishes," posted Feb. 16, 2005, at <http://media.barometer.orst.edu/home/index.cfm?event=displayArticlePrinterFriendly&uSt . . .>, copyright 2007, The Daily Barometer, printed Feb. 16, 2007, 2 pages.

"Digital Tech Life >> Download of the Week," earliest post Sep. 30, 2005, latest post Jul. 2, 2006, at <http://www.digitaltechlife.com/category/download-of-the-week/>, printed Feb. 16, 2007, 9 pages.

"Digital Music News," at <http://www.digitalmusicnews.com/results?title=musicstrands>, copyright 2003-6 Digital Music News, earliest post Aug. 2005, latest post May 2006, printed Aug. 8, 2006, 5 pages.

"GenieLab::Music Recommendation System," at <http://genielab.com/>, from the Internet Archive on Aug. 13, 2006, copyright 2005, GenieLab, LLC, printed Oct. 30, 2007, 1 page.

GenieLab.com grants music lovers' wishes, http://barometer.orst.edu/home/index.cfm?event=displayArticlePrinterFrien-dly&uS-tory.sub.—id=5c420acf-a1fb-448c-8ffd-39ec5c448b6f.

Golbeck, Jennifer, "Trust and Nuanced Profile Similarity in Online Social Networks," Mindswap Technical Report TR-MS1284, 2006, available from <http://www.cs.umd.edu/~golbeck/publications.shtml>, 30 pages.

"Goombah" Preview, at <http://www.goombah.com/preview.html>, printed Jan. 8, 2008, 5 pages.

"Gracenote," found at <http://www.gracenote.com>, printed Feb. 7, 2007, available on Internet Archive at least as early as Jan. 2006, 1 page.

"Gracenote Playlist," Product Overview, Revised Dec. 29, 2005, copyright 2005, Gracenote, 2 pages.

"Gracenote Playlist Plus," Product Overview, Revised Dec. 29, 2005, copyright 2005, Gracenote, 2 pages.

"How many songs are in your iTunes Music library (or libraries in total, if you use more than one)?," at <http://www.rnacoshints.com/polls/index.php?pid=itunesmusiccount>, includes postings dated as early as Jun. 2008, printed Feb. 24, 2010, copyright 2010, Mac Publishing LLC, 10 pages.

"Zune.net—How—To—Share Audio Files Zune to Zune," http://web.archive.org/web/20070819121705/http://www.zune.net/en-us/support/howto/z . . ., copyright 2007 Microsoft Corporation, printed Nov. 14, 2007, 2 pages.

Huang, Yao-Chang et al., "An Audio Recommendation System Based on Audio Signature Description Scheme in MPEG-7 Audio," IEEE International Conference on Multimedia and Expo (ICME), Jun. 27-30, 2004, IEEE, pp. 639-642.

"Hulu—About," at <http://www.hulu.com/about/product_tour>, copyright 2010, Hulu LLC, appears to have been accessible as early as early 2008, printed Jun. 15, 2010, 2 pages.

Nilsson, Martin, "id3v2.4.0-frames—ID3.org," at <http://www.id3.org/id3v2.4.0-frames>, dated Nov. 1, 2000, last updated Dec. 18, 2006, copyright 1998-2009, printed Jun. 15, 2010, 31 pages.

"Identifying iPod models," at <http://supportapple.com/kb/HT1353>, page last modified Jan. 15, 2010, includes information dating back to 2001,printed Feb. 24, 2010, 13 pages.

"IEEE 802.11—Wlkipedia, the free encyclopedia," http://en.wikipedia.org/wiki/IEEE_802.11, printed Oct. 26, 2007, 5 pages.

"iLikeTM—Home," found at <http://www.ilike.com/>, copyright 2007, iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Instant Messenger—AIM—Instant Message Your Online Buddies for Free—AIM," http://dashboard.aim.com/aim, copyright 2007 AOL LLC, printed Nov. 8, 2007, 6 pages.

Kosugi, Naoko et al., "A Practical Query-By-Humming System for a Large Music Database,"Proceedings of the 8th ACM International Conference on Multimedia, Oct. 30-Nov. 3, 2000, Los Angeles, California, copyright 2000, ACM, pp. 333-342.

"Last.fm—The Social Music Revolution," at <http://www.last.fm/>, printed Feb. 7, 2007, 1 page.

"Listen with Last.fm and fuel the social music revolution," at <http://www.last.fm/tour/>, copyright 2002-2007, Last.fm Ltd., printed Oct. 4, 2007, 1 page.

"Last.fm—Wikipedia, the free encyclopedia," at <http://en.wikipedia.org/wiki/Last.fm>, last modified on Aug. 8, 2006, printed Aug. 8, 2006, 7 pages.

"LAUNCHcast Radio—Yahoo! Messenger," http://messenger.yahoo.com/launch.php, copyright 2007 Yahoo! Inc., printed Nov. 8, 2007, 1 page.

"LimeWire—Wikipedia, the free encyclopedia," at <http://en.wikipedia.org/wiki/LimeWire>, last modified Aug. 6, 2006, printed Aug. 8, 2006, 2 pages.

"liveplasma music, movies, search engine and discovery engine," at <http://www.liveplasma.com>, printed May 17, 2007, 1 page.

"Loomia Personalized Recommendations for Media, Content and Retail Sites," at <http://www.loomia.com/>, copyright 2006-2007, Loomia Inc., printed Feb. 7, 2007, 2 pages.

Mascia, J. And Reddy, S., "cs219 Project Report—Lifetrak: Music in Tune With Your Life," Department of Electrical Engineering, UCLA '06, Los Angeles, California, copyright 2006, ACM, 11 pages.

"Mercora - Music Search and Internet Radio Network," at <http://www.mercora.com/overview.asp>, copyright 2004-2006, Mercora, Inc., printed Aug. 8, 2006, 1 page.

"Mercora—Music Search and Internet Radio Network," at <http://www.mercora.com/v6/_front/web.jsp>, printed Feb. 7, 2007, 1 page.

Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

"Mongomusic.com—The Best Download mp3 Resource and Information. This website is for sale!," http://www.mongomusic.com/, printed May 17, 2007, 2 pages.

"MP3 music download website, eMusic," at <http://www.emusic.com/>, copyright 2007, eMusic.com Inc., printed Feb. 7, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"Music Recommendations 1.0—MacUpdate," at <http://www.macupdate.com/info.php/id/19575>, printed Feb. 16, 2007, 1 page.

Wang, J. and Reinders, M.J.T., "Music Recommender system for Wi-Fi Walkman," No. ICT-2003-01 in the -ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.

"MusicGremlin," at <http://www.musicgremlin.com/StaticContent.aspx?id=3>, copyright 2005, 2006, 2007, MusicGremlin, Inc., printed Oct. 26, 2007, 1 page.

"MusicIP—The Music Search Engine," at <http://www.musicip.com/>, copyright 2006-2007, MusicIP Corporation, printed Feb. 7, 2007, 1 page.

"Musicstrands.Com—Because Music is Social," brochure, copyright 2006, MusicStrands, Inc., 2 pages.

"MyStrands Download," at <http://www.mystrands.com/overview.vm>, copyright 2003-2007, MediaStrands, Inc., printed Feb. 7, 2007, 3 pages.

"MyStrands for Windows 0.7.3 Beta," copyright 2002-2006, ShareApple.com networks, printed Jul. 16, 2007, 3 pages.

"MyStrands for Windows Change Log," at <http://www.mages.

"Napster—All the Music You Want," at <http://www.napster.com/using_napster/all_the_music_you_want.html>, copyright 2003-2006, Napster, LLC, printed Feb. 7, 2007, 2 pages.

"Not safe for work—Wikipedia, the free encyclopedia," http://en.wikipedia.org/wiki/Work_safe, printed Nov. 8, 2007, 2 pages.

"Outlook Home Page—Microsoft Office Online," http://office.microsoft.com/en-us/outlook/default.aspx, copyright 2007 Microsoft Corporation, printed Nov. 8, 2007, 1 page.

"FAQ," at <http://blog.pandora.com/faq/>, copyright 2005-2006, Pandora Media, Inc., printed Aug. 8, 2006, 20 pages.

"Pandora Internet Radio—Find New Music, Listen to Free Web Radio," at <http://www.pandora.com/>, copyright 2005-2007, Pandora Media, Inc., printed Feb. 7, 2007, 1 page.

"Pandora Radio —Listen to Free Internet Radio, Find New Music —The Music Genome Project," at <http://www.pandora.com/mgp>, copyright 2005-2007, Pandora Media, Inc., printed Oct. 26, 2007, 1 page.

Sarwar, Badrul M. et al., "Recommender Systems for Large-scale E-Commerce: Scalable Neighborhood Formation Using Clustering," Proceedings of the Fifth International Conference on Computer and Information Technology, Dec. 27-28, 2002, East West University, Dhaka, Bangladesh, 6 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestrearn%20review%20of%20personalization&source=web&cd=1&ved=0CDcQFjAA&url=http%3A%2F%2Fwww.behavioraltargeting.info%2Fdownloadatt.achment.php%3Fald%3Dcf74d490a8b97edd535b4ccdbfdOdf55%26articleld%3D31&ei=C2jeTr71Aur ZOIDGCgsGvBw&usg=AFQCNEBLn7jJCDh-VYty3h79uFKGFBkRw>, 13 pages.

"Rhapsody—Full-length music, videos and more—Free," http://www.rhapsody.com/welcome.html, copyright 2001-2007 Listen.com, printed Feb. 7, 2007, 1 page.

"Ringo: Social Information Filtering for Music Recommendation," http://jolomo.net/ringo.html, printed Aug. 3, 2009, 1 page.

"RYM FAQ—Rate Your Music," at <http://rateyourmusic.com/faq/>, copyright 2000-2007, rateyourmusic.com, printed Nov. 8, 2007, 14 pages.

"SongReference," at <http://songreference.com/>, copyright 2008, SongReference.com, printed Jun. 15, 2010, 1 page.

"Soundflavor," at <http://www.soundflavor.com/>, copyright 2003-2007, Soundflavor, Inc., printed Feb. 7, 2007, 1 page.

"Start Listening with Last.fm," at <http://www.last.fm/>, date unknown but may date back as early as 2002, 1 page.

"MyStrands Social Recommendation and Discovery," at <http://www.mystrands.com/>, copyright 2003-2007 MediaStrands, Inc., printed Feb. 7, 2007, 2 pages.

"Subscribe to Napster," at <http://www.napster.com/subscribe>, found on the Internet Archive, dated Aug. 6, 2006, copyright 2003-2006, Napster, LLC, printed Dec. 21, 2011, 4 pages.

"Take a look at the Future of Mobile Music :: MUSIC GURU," at <http://www.symbian-freak.com/news/006/02/music_guru.htm, Feb. 23, 2006, copyright 2005, Symbian freak, printed Februray 7, 2007, 3 pages.

"that canadian girl >> Blog Archive GenieLab," posted Feb. 22, 2005, at <http://www.thatcanadiangirl.co.uk/blog/2005/02/22/genielab/>, copyright 2007, Vero Pepperrell, printed Feb. 16, 2007, 3 pages.

"The Classic TV Database—Your Home for Classic TV! —www.classic-tv.com," http://www.classictv.com, copyright the Classic TV Database—www.classic-tv.com, printed Feb. 7, 2007, 3 pages.

Nealon, Andrew D., "The Daily Barometer—GenieLab.com grants music lovers' wishes,"-posted Feb. 16, 2005, at <http://media.barometer.orst.edu/home/index.cfm?event=displayArticlePrinterFriendly&uSt . . .>, copyright 2007, The Daily Barometer, printed Feb. 16, 2007, 2 pages.

"Thunderbird - Reclaim your inbox," http://www.mozilla.com/en-US/thunderbird/, copyright 2005-2007 Mozilla, printed Nov. 8, 2007, 2 pages.

"Tour's Profile," at <http://mog.com/Tour>, copyright 2006-2009, Mog Inc., printed Aug. 3, 2009, 11 pages.

"Trillian (software)—Wikipedia, the free encyclopedia," http://en.wikipedia.org/wiki/Trillian_(instant_messenger), printed Nov. 8, 2007, 11 pages.

"Try Napster free for 7 Days—Play and download music without paying per song.," http://www.napster.com/choose/index.html, copyright 2003-2007 Napster, LLC, printed Feb. 7, 2007, 1 page.

"UpTo11.net—Music Recommendations and Search," at <http://www.upto11.net/>, copyright 2005-2006, Upto11.net, printed Feb. 7, 2007, 1 page.

"About uPlayMe," at <http://www.uplayme.com/about.php>, copyright 2008, uPlayMe, Inc., 4 pages.

"uPlayMe.com Meet People, Music Sharing —Home," at <http://www.uplayme.com/>, copyright 2008, uPlayMe, Inc., printed Mar. 26, 2009, 1 page.

"Webjay—Playlist Community," at <http://www.webjay.org/>, copyright 2006, Yahoo! Inc., printed Feb. 7, 2007, 5 pages.

"Welcome to the Musicmatch Guide," at <http://www.mmguide.musicmatch.com/>, copyright 2001-2004, Musicmatch, Inc., printed Feb. 7, 2007, 1 page.

"What is the size of your physical and digital music collection?," at <http://www.musicbanter.com/general-music/47403-what-size-your-physical-digital-music-collection12.html>, earliest posting shown: Sep. 21, 2008, printed Feb. 24, 2010, copyright 2010, Advameg, Inc., SEO by vBSEO 3.2.0 copyright 2008, Crawlability, Inc., 6 pages.

Dean, Katie, "Whose Song Is That, Anyway?," Wired News, Feb. 12, 2003, at <http://www.wired.com/news/digiwood/1,57634-0.html>, copyright 2005, Lycos, Inc., printed Oct. 9, 2006, 3 pages.

"Yahoo! Music," at <http://music.yahoo.com>, dated Jun. 20, 2005, from the Internet Archive, copyright 2005, Yahoo! Inc., printed Dec. 18, 2009, 14 pages.

"Yahoo Music Jukebox," Wikipedia, at <http://en.wikipedia.org/wiki/Yahoo_music_engine>, last modified Aug. 3, 2006, printed Aug. 8, 2006, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"YouTube—Broadcast Yourself.," at <http://www.youtube.com/>, copyright 2007, YouTube, LLC, printed Oct. 26, 2007, 2 pages.

* cited by examiner

CACHING AND SYNCHING PROCESS FOR A MEDIA SHARING SYSTEM

RELATED APPLICATIONS

This application is related to U.S. patent application Ser. No. 12/251,490, entitled SOURCE INDICATORS FOR ELEMENTS OF AN AGGREGATE MEDIA COLLECTION IN A MEDIA SHARING SYSTEM, which was filed on Oct. 15, 2008, U.S. patent application Ser. No. 12/251,530, entitled BRIDGING IN A MEDIA SHARING SYSTEM, which was filed on Oct. 15, 2008, and U.S. patent application Ser. No. 12/251,542, entitled COLLECTION DIGEST FOR A MEDIA SHARING SYSTEM, which was filed on Oct. 15, 2008, all of which are hereby incorporated herein by reference in their entireties.

FIELD OF THE INVENTION

The present invention relates to media sharing.

BACKGROUND OF THE INVENTION

With the advent of portable media players, such as the Apple® iPod® portable media players, digital media has become prolific. However, even though user media collections of many users include hundreds if not thousands of media items, no one user owns every media item. As such, users often desire to share their media collections. For example, the Apple® iTunes® media player allows users to share their media collections with up to five users on the same subnetwork. In the Apple® iTunes® media player, the sharing user must designate what portion of their media collection to share (e.g., the entire media collection, two or more songs, or a playlist). However, users with which the media collection is shared are limited by the fact that the shared media collection is disjoint from their own media collection. Another issue is that sharing is limited to users in the same subnetwork. Thus, there is a need for an improved system and method for sharing media collections.

SUMMARY OF THE INVENTION

The present invention relates to a caching or synching process in a media sharing system. In one embodiment, a user device of a user joins a media sharing system including the user device and one or more other user devices connected via a network such that the user of the user device has access to one or more shared media collections hosted by the one or more other user devices. Shared media items from the one or more shared media collections are scored. The user device then obtains shared media items scored above a defined threshold from the one or more other user devices hosting the one or more corresponding shared media collections and stores those shared media items in local storage. In one embodiment, the local storage is temporary storage, such as a cache.

In one embodiment, at least one of the shared media collections is a media collection of another user hosted by one of the other user devices associated with that user, and at least one of the shared media collections is a media collection of the user that is hosted by one of the other user devices. As such, for each shared media item scored above the defined threshold, only limited access rights are granted to the user at the user device if the shared media item is obtained from the media collection of another user. If the shared media item is obtained from a media collection of the user of the user device that is hosted by one of the other user devices, then unlimited access rights to the shared media item may be granted to the user at the user device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
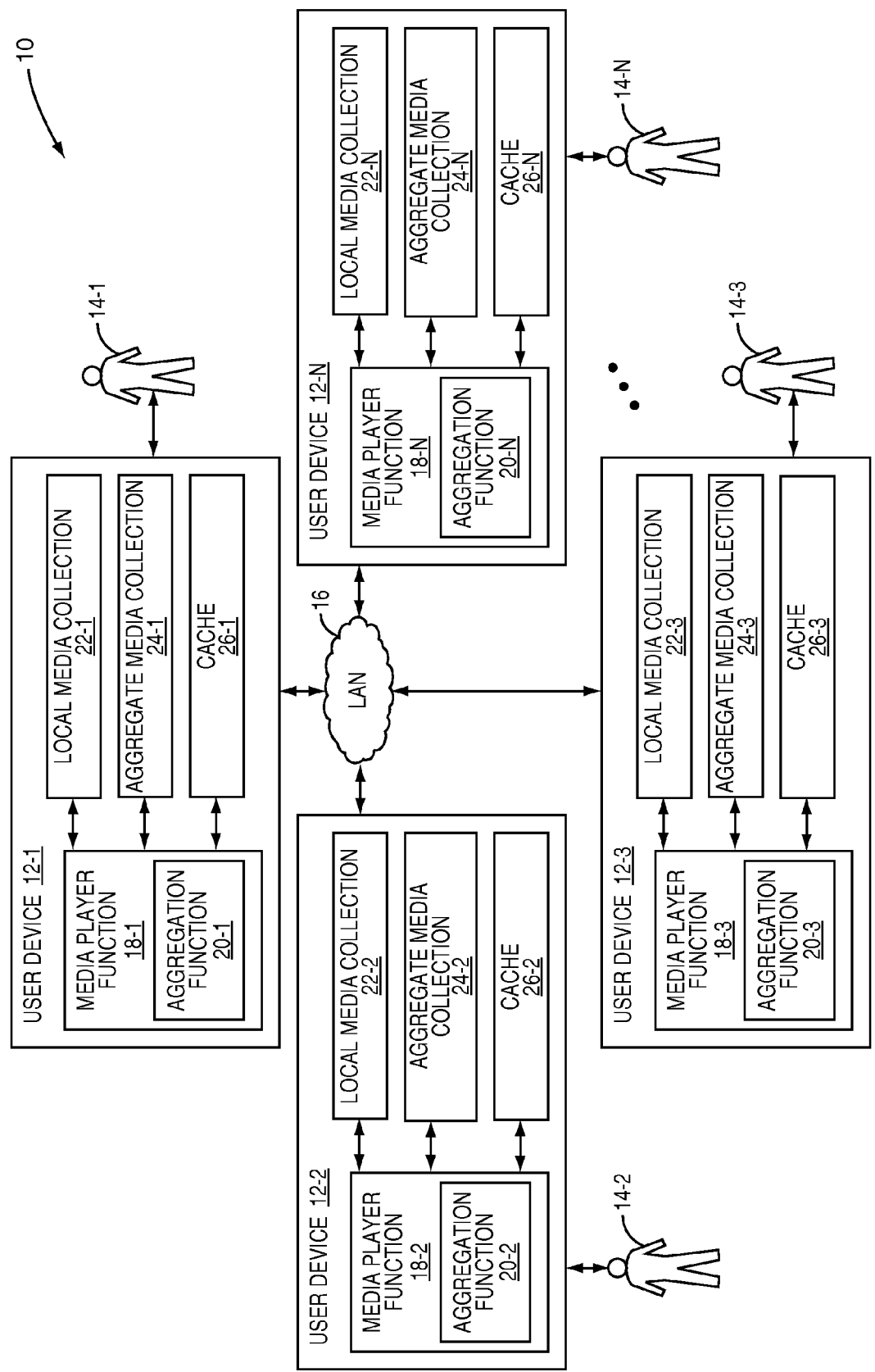
FIG. 1 illustrates a media sharing system according to one embodiment of the present invention.

FIG. 1 illustrates an exemplary media sharing system 10 according to one embodiment of the present invention. In general, the media sharing system 10 includes a number of user devices 12-1 through 12-N having associated users 14-1 through 14-N. In this embodiment, the user devices 12-1 through 12-N are connected via a Local Area Network (LAN) 16 and are part of the same subnetwork. However, the present invention is not limited thereto. The user devices 12-1 through 12-N may alternatively be connected via a Wide Area Network (WAN), a global network such as the Internet, or the like. As yet another alternative, some of the user devices 12-1 through 12-N may be connected via a LAN while others are connected via a WAN or global network.

Each of the user devices 12-1 through 12-N may be, for example, a personal computer, a mobile smart phone, a set-top box, a portable media player, or the like. Looking at the user device 12-1, the user device 12-1 includes a media player function 18-1 which may be implemented in software, hardware, or a combination thereof. In addition to providing media playback capabilities, the media player function 18-1 includes an aggregation function 20-1. In an alternative embodiment, the aggregation function 20-1 may be implemented as a separate function. For example, if the media player function 18-1 is a software media player application, the aggregation function 20-1 may be implemented as a plug-in. In general, the aggregation function 20-1 operates to generate an aggregate media collection 24-1 for the user 14-1 including media items in a local media collection 22-1 of the user 14-1 and media items from one or more remote shared media collections hosted by one or more of the other user devices 12-2 through 12-N. The local media collection 22-1 of the user 14-1 includes a number of media items owned by the user 14-1 and stored at the user device 12-1. The media items may include one or more audio items such as, for example, songs, podcasts, or audio books; one or more video items such as, for example, movies, television programs, or video clips; or the like. In addition, the user device 12-1 may include cache 26-1. As discussed below, the cache 26-1 may be utilized to temporarily store shared media items obtained from one or more of the other user devices 12-2 through 12-N via caching.

Like the user device 12-1, the other user devices 12-2 through 12-N include media player functions 18-2 through 18-N having corresponding aggregation functions 20-2 through 20-N. In addition, the other user devices 12-2 through 12-N include local media collections 22-2 through 22-N, aggregate media collections 24-2 through 24-N, and storages 26-2 through 26-N, respectively.

Figure 2:
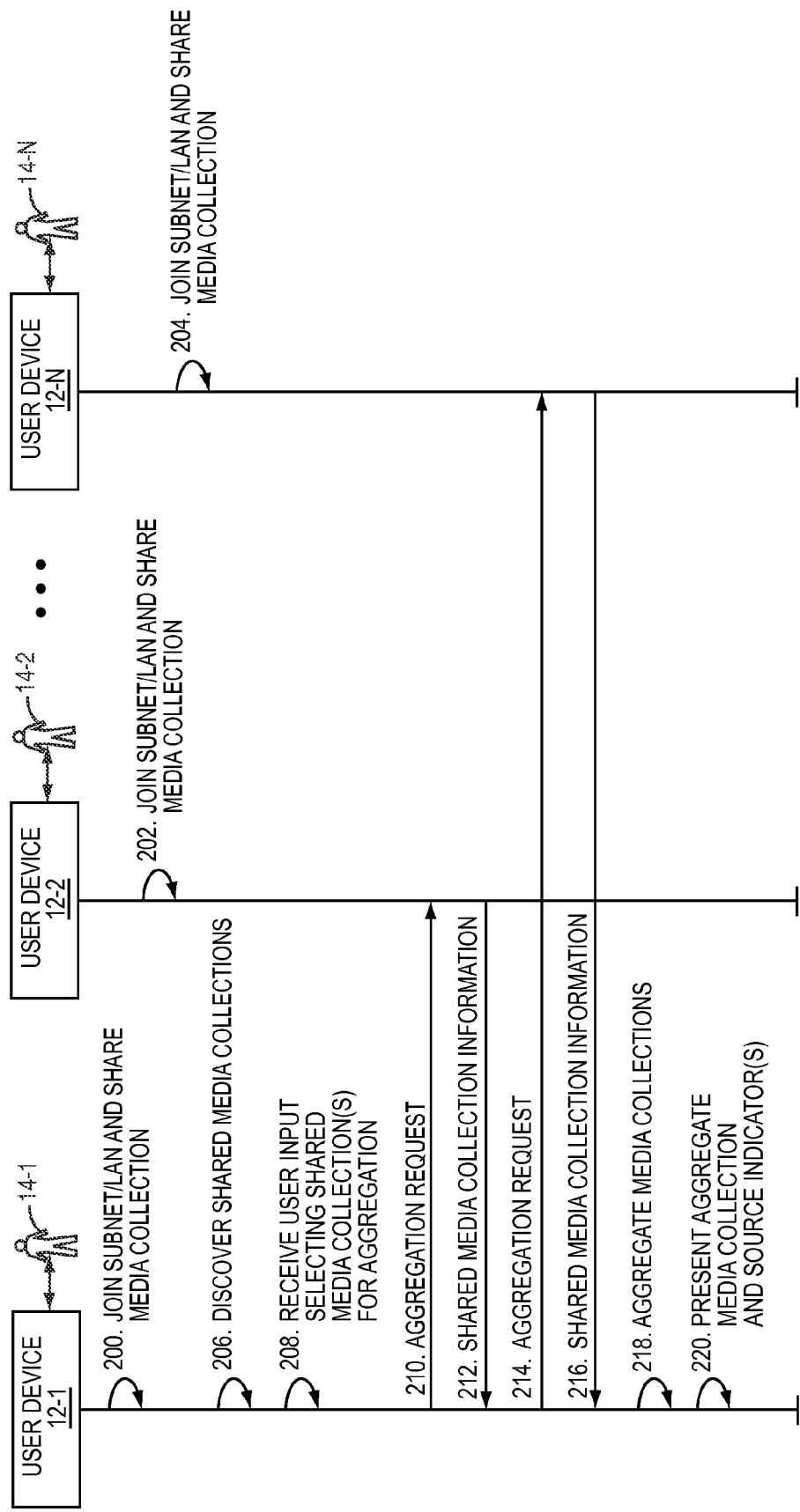
FIG. 2 illustrates the operation of the media sharing system including the presentation of one or more source indicators according to one embodiment of the present invention.

FIG. 2 illustrates the operation of the media sharing system 10 of FIG. 1 according to one embodiment of the present invention. First, the user devices 12-1 and 12-2 through 12-N join the LAN 16 by, for example, coming online (steps 200-204). Next, the aggregation function 20-1 of the user device 12-1 identifies, or discovers, media collections shared by the users 14-2 through 14-N of the user devices 12-2 through 12-N (step 206). For example, in a MAC OSX or Windows environment where the user devices 12-1 through 12-N are connected via the LAN 16, Bonjour may be used to identify the shared media collections of the users 14-2 through 14-N. The media collections shared by the users 14-2 through 14-N are preferably the local media collections 22-2 through 22-N of the users 14-2 through 14-N. However, the present invention is not limited thereto. In one exemplary alternative embodiment, the media collections shared by the users 14-2 through 14-N may be the aggregate media collections 24-2 through 24-N of the users 14-2 through 14-N. In this embodiment, the aggregation function 20-1 of the user device 12-1 presents a list of the shared media collections of the users 14-2 through 14-N to the user 14-1 and then receives user input from the user 14-1 selecting one or more of the shared media collections for aggregation (step 208). In this example, the user 14-1 selects at least the shared media collections of the users 14-2 and 14-N, which are hosted by the user devices 12-2 and 12-N, respectively.

The aggregation function 20-1 of the user device 12-1 then issues an aggregation request to the user device 12-2 of the user 14-2 (step 210). In response, in this embodiment, the aggregation function 20-2 of the user device 12-2 returns information, which is also referred to herein as shared media collection information, identifying media items in the shared media collection of the user 14-2 to the user device 12-1 of the user 14-1 (step 212). Likewise, the aggregation function 20-1 of the user device 12-1 issues an aggregation request to the user device 12-N of the user 14-N (step 214). In response, the aggregation function 20-N of the user device 12-N returns information identifying media items in the shared media collection of the user 14-N to the user device 12-1 of the user 14-1 (step 216). Note that aggregation requests may also be issued to and shared media collection information received from other user devices from the user devices 12-3 through 12-N-1 (not shown) hosting shared media collections selected by the user 14-1.

Upon receiving the shared media collection information, the aggregation function 20-1 of the user device 12-1 aggregates or merges the local media collection 22-1 of the user 14-1 and the shared media collections to provide the aggregate media collection 24-1 of the user 14-1 (step 218). More specifically, in one embodiment, the aggregation function 20-1 of the user device 12-1 aggregates the shared media collection information identifying the media items in the shared media collections selected by the user 14-1 for aggregation and information identifying the media items in the local media collection 22-1 of the user 14-1 to provide a list of unique media items available either from the local media collection 22-1 of the user 14-1 or one of the shared media collections selected by the user 14-1 for aggregation. In addition, for each unique media item, a secondary list of available sources for the unique media item may be generated. Together, the list of unique media items and the corresponding secondary lists of sources for the unique media items form the aggregate media collection 24-1 of the user 14-1. For more information, the interested reader is directed to commonly owned and assigned U.S. patent application Ser. No. 12/104,572, entitled METHOD AND SYSTEM FOR AGGREGATING MEDIA COLLECTIONS BETWEEN PARTICIPANTS OF A SHARING NETWORK, which was filed on Apr. 17, 2008 and is hereby incorporated herein by reference in its entirety. Note that while the discussion herein focuses on an embodiment where the shared media collections are aggregated with the local media collection 22-1 of the user 14-1, the present invention is not limited thereto. The user 14-1 may choose not to select his local media collection 22-1 for aggregation, in which case the shared media collections would be aggregated with one another to provide the aggregate media collection 24-1 of the user 14-1.

In addition to including media items, the aggregate media collection 24-1 of the user 14-1 may include an aggregate list of playlists, or aggregate playlists. More specifically, the local media collection 22-1 of the user 14-1 as well the shared media collections selected by the user 14-1 for aggregation may include static or dynamic playlists. Information identifying the playlists may then be included within or provided in association with the shared media collection information. Then, when generating the aggregate media collection 24-1 of the user 14-1, the aggregation function 20-1 of the user device 12-1 may also aggregate the playlists of the shared media collections selected by the user 14-1 and the playlists in the local media collection 22-1 of the user 14-1. When aggregating playlists, a list of unique playlists may be generated. As used herein, a unique playlist is a playlist having a unique title. Playlists having the same title may be combined or merged. For example, an "80s" playlist of the user 14-1 may be combined with an "80s" playlist of the user 14-2 to provide an aggregate "80s" playlist including both the media items from the "80s" playlist of the user 14-1 and the media items from the "80s" playlist of the user 14-2.

Once the aggregate media collection 24-1 of the user 14-1 is generated, the aggregate media collection 24-1 and one or more source indicators are presented to the user 14-1 via, for example, a Graphical User Interface (GUI) (step 220). Each source indicator is presented in association with a corresponding element of the aggregate media collection 24-1 and operates to identify a source for that element of the aggregate media collection 24-1. The source of an element of the aggregate media collection 24-1 may be the local media collection 22-1 of the user 14-1 or one of the shared media collections selected by the user 14-1 for aggregation. As used herein, an element of the aggregate media collection 24-1 may be a playlist in the aggregate media collection 24-1 or a unique media item in the aggregate media collection 24-1.

At this point, the user 14-1 may utilize the aggregate media collection 24-1 in much the same manner as using the local media collection 22-1. For example, the user 14-1 may select media items from the aggregate media collection 24-1 for playback, generate playlists including media items from the aggregate media collection 24-1, generate smart or dynamic playlists that are populated from the aggregate media collection 24-1, play media items in an existing playlist, or the like. In one embodiment, in order to provide playback of a media item that is from a shared media collection of another user, the media item is requested from the user device hosting the shared media collection and streamed from that user device to the user device 12-1 of the user 14-1. For example, if the user 14-1 initiates playback of a media item and that media item's source is the shared media collection hosted by the user device 12-2, the media player function 18-1 of the user device 12-1 requests the media item from the user device 12-2. In response, the user device 12-2, and specifically the media player function 18-2 of the user device 12-2, delivers the media item to the user device 12-1 for playback. In the preferred embodiment, the media item is delivered via streaming.

FIGS. 3A through 3E illustrate an exemplary GUI 28 for presenting one or more source indicators in association with one or more elements of an aggregate media collection of a user according to one embodiment of the present invention. Note that in this exemplary embodiment, the media items shared via the media sharing system 10 are songs. However, as discussed above, the present invention is not limited thereto.

Figure 3A:
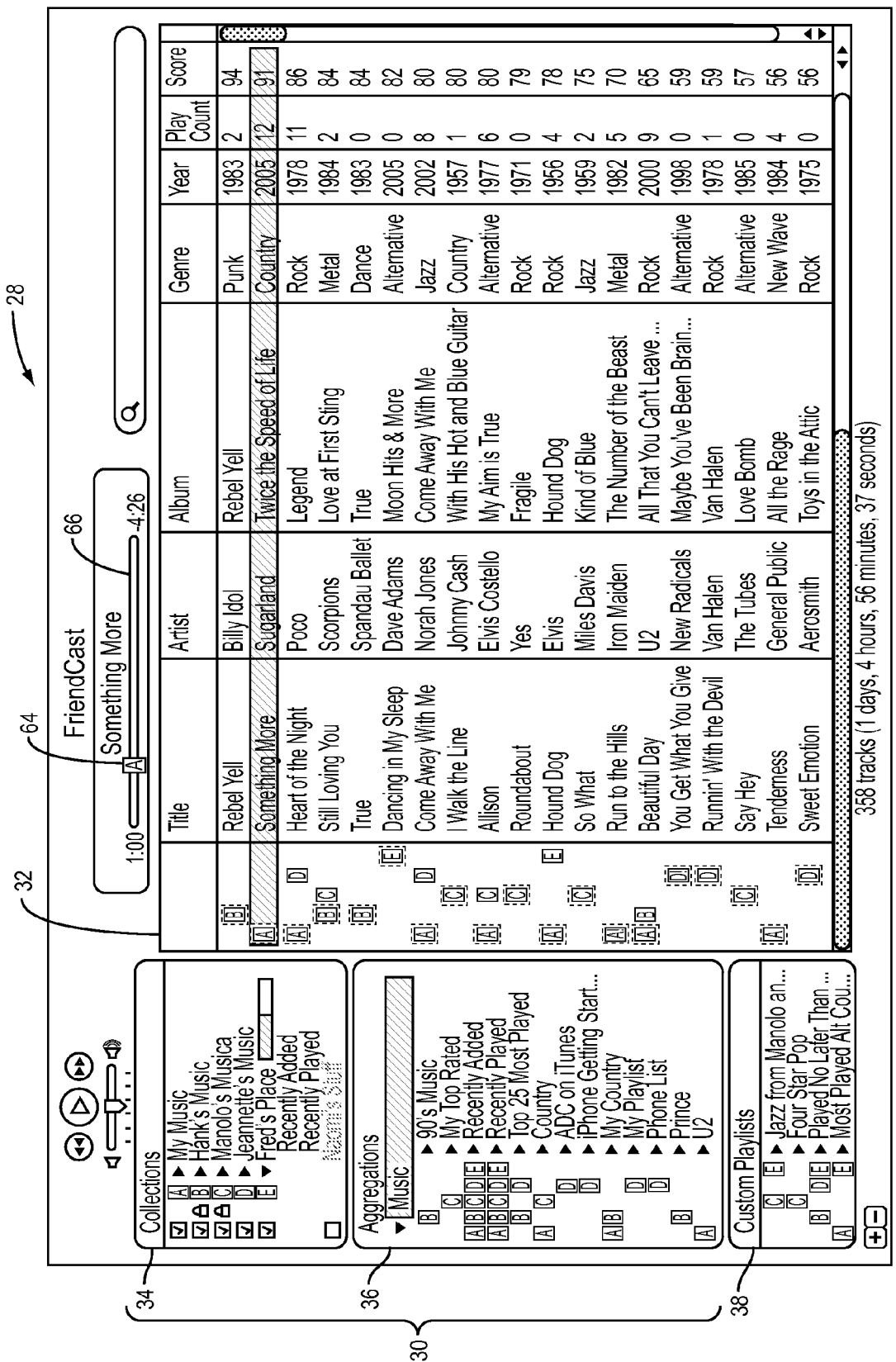
FIGS. 3A through 3E illustrate an exemplary Graphical User Interface (GUI) including source indicators according to one embodiment of the present invention.

As shown in FIG. 3A, the GUI 28 includes a navigation area 30 and a display area 32. The navigation area 30 generally enables the user, which in this example is the user 14-1, to select media collections to be aggregated as well as to navigate his aggregate media collection 24-1. The navigation area 30 includes a media collection selection area 34 and a playlist selection area 36. The media collection selection area 34 is used to present a list of media collections available to the user 14-1 and to enable the user 14-1 to select two or more of the media collections for aggregation. In this example, the list of media collections available to the user 14-1 includes the local media collection 22-1 of the user 14-1, which has the title "My Music," and five shared media collections having the titles "Hank's Music," "Manolo's Musica," "Jeannette's Music," "Fred's Place," and "Naomi's Stuff." In this example, the user 14-1 has selected his local media collection 22-1 having the title "My Music" and the shared media collections having the titles "Hank's Music," "Manolo's Musica," "Jeannette's Music," and "Fred's Place" for aggregation. Note that the maximum number of collections that may be selected for aggregation may be limited. For example, the media sharing system 10 may limit the number of shared media collections that a user may select for aggregation to five (5).

As discussed below in detail, each of the media collections selected for aggregation is assigned a unique source identifier. In this example, the source identifiers are alphabetic letters (A, B, C, etc.). However, the present invention is not limited thereto. Any type of indicator enabling the user 14-1 to visually distinguish sources of elements of his aggregate media collection 24-1 may be used. For example, in another embodiment, each of the media collections selected for aggregation, which are also referred to herein as sources, may be assigned a unique color. The colors may then be used as source indicators by placing corresponding colored blocks or boxes next to the corresponding elements of the aggregate media collection 24-1 and/or by using text of the corresponding colors for the corresponding elements of the aggregate media collection 24-1.

The playlist selection area 36 generally enables the user 14-1 to navigate his aggregate media collection 24-1. In this example, the aggregate media collection 24-1 is an aggregate music collection. Thus, by selecting the "Music" identifier in the playlist selection area 36, a list of the unique songs in the aggregate music collection 24-1 of the user 14-1 is presented in the display area 32. Further, in this example, the "Music" identifier is hierarchical. In other words, the "Music" identifier may be expanded as shown to view a list of aggregate playlists in the aggregate music collection 24-1 of the user 14-1. Note that source identifiers are presented in association with each aggregate playlist to indicate the source or sources of media items in the aggregate playlist.

In addition, the GUI 28 includes a custom playlists area 38. The custom playlists area 38 enables the user 14-1 to define static or dynamic playlists created specifically for the aggregate media collection 24-1.

Figure 3B:
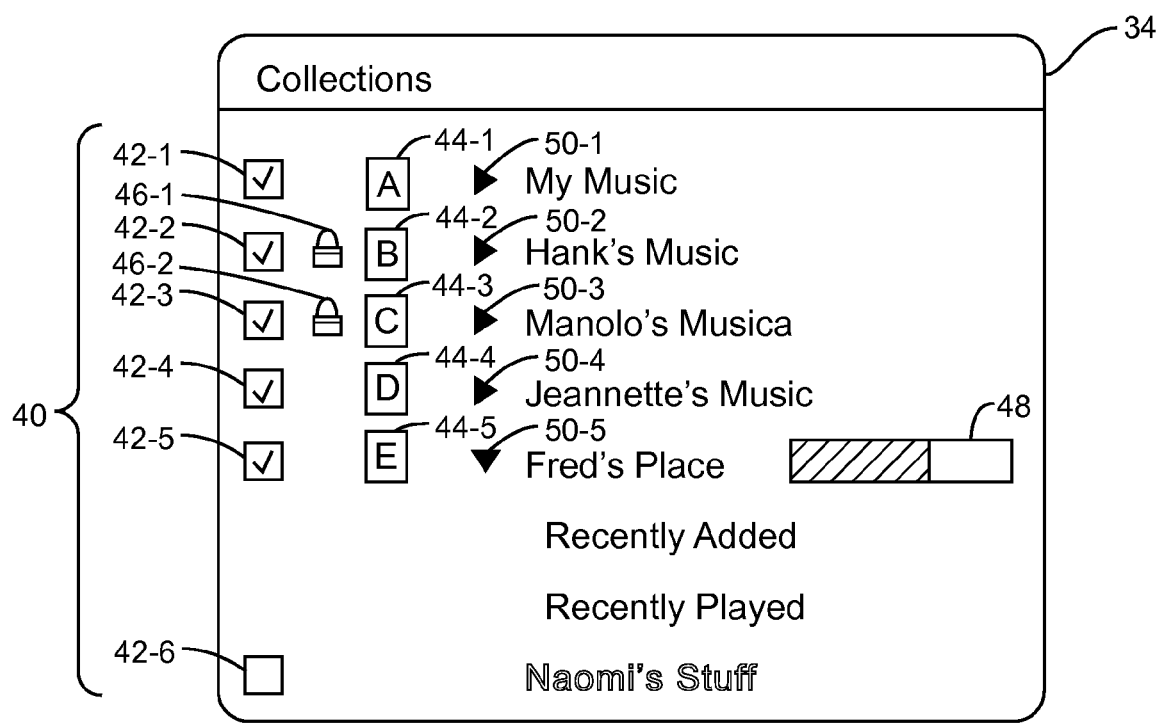

FIG. 3B is a blow-up of the media collection selection area 34 of FIG. 3A. As shown, the media collection selection area 34 includes a list of media collections 40 available to the user 14-1. The user 14-1 is enabled to select desired media collections for aggregation via corresponding check boxes 42-1 through 42-6. In this example, the user 14-1 has selected his local media collection 22-1, which is titled "My Music," and the shared media collections "Hank's Music," Manolo's Musica," "Jeannette's Music," and "Fred's Place" by activating the corresponding check boxes 42-1 through 42-5. Note that, in this example, the user 14-1 is limited to selecting at most five (5) media collections for aggregation. As such, since five (5) media collections have been selected, the shared media collection "Naomi's Stuff" is grayed-out and cannot be selected by the user 14-1 unless the user 14-1 deselects one of the other selected media collections. Note that the maximum number of media collections that may be selected is preferably a system-defined limit. However, in an alternative embodiment, the user 14-1 may be enabled to define the maximum number of media collections that may be aggregated.

Further, unique source indicators 44-1 through 44-5 (hereinafter source indicators 44-1 through 44-5) are assigned to the media collections selected for aggregation. In this example, the source indicators 44-1 through 44-5 are the letters A, B, C, D, and E positioned inside boxes. However, the present invention is not limited thereto. For example, the source indicators 44-1 through 44-5 may alternatively be colors. As discussed below, the source indicators 44-1 through 44-5 are presented in association with elements of the aggregate media collection 24-1 of the user 14-1 in order to identify the source or sources for the elements of the aggregate media collection 24-1 of the user 14-1.

Password-protection indicators 46-1 and 46-2 indicate that the corresponding media collections are password protected. As such, the user 14-1 must enter the correct passwords for the password protected media collections before the media collections can be aggregated or, alternatively, before the user 14-1 is enabled to play the media items from the password protected media collections. A progress indicator 48 may be used to show the progress of obtaining or downloading the shared media collection information for the corresponding shared media collection. Thus, in this example, the shared media collection information for the selected shared media collections other than "Fred's Place" have already been downloaded, and the download of the shared media collection information for "Fred's Place" is still in progress.

In this example, the identifiers for the selected media collections are hierarchical. As such, hierarchical controls 50-1 through 50-5 may be used to expand the identifiers to show a number of subgroups of media items within the corresponding media collections. In this example, the subgroups are playlists. As such, using "Fred's Place" as an example, the hierarchical control 50-5 may be activated to view the playlists included in the shared media collection "Fred's Place," which are a "Recently Added" playlist and a "Recently Played" playlist.

Figure 3C:
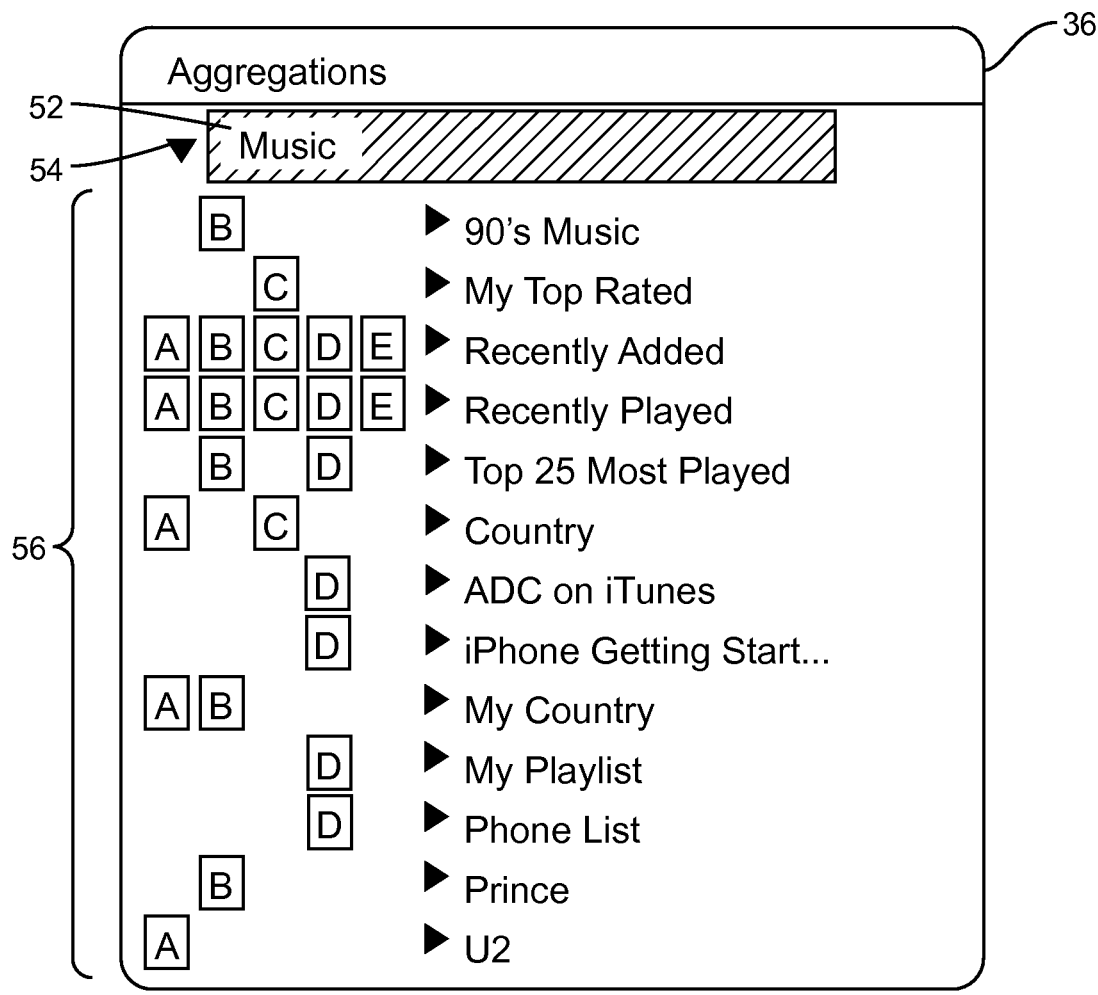

FIG. 3C is a blow-up of the playlist selection area 36. As discussed above, the playlist selection area 36 generally enables the user 14-1 to navigate his aggregate media collection 24-1. In this example, the aggregate media collection 24-1 is an aggregate music collection. Thus, by selecting a "Music" identifier 52, a list of the unique songs in the aggregate media collection 24-1 of the user 14-1 is presented in the display area 32 (FIG. 3A). Further, in this example, the "Music" identifier 52 is hierarchical. As such, by selecting hierarchical control 54, the user 14-1 can expand the "Music" identifier 52 to view a list of aggregate playlists 56 in the aggregate music collection 24-1 of the user 14-1. In this example, the aggregate playlists include a "90's Music" playlist, a "My Top Rated" playlist, etc.

One or more source indicators are presented in association with each of the aggregate playlists in order to identify the source or sources of the media items in the aggregate playlists. The source indicators presented in association with the aggregate playlists correspond to the source indicators 44-1 through 44-5 (FIG. 3B) assigned to the media collections selected for aggregation. As such, the user 14-1 can easily identify which source or sources contribute to each of the aggregate playlists. For example, the "90's Music" playlist has only media items from the source identified by the "B" source indicator, which in this example is the "Hank's Music" shared media collection (FIG. 3B). As another example, the "Top 25 Most Played" playlist has media items from the sources identified by the "B" source identifier and the "D" source identifier, which in this example are the "Hank's Music" and "Jeannette's Music" shared media collections.

Figure 3D:
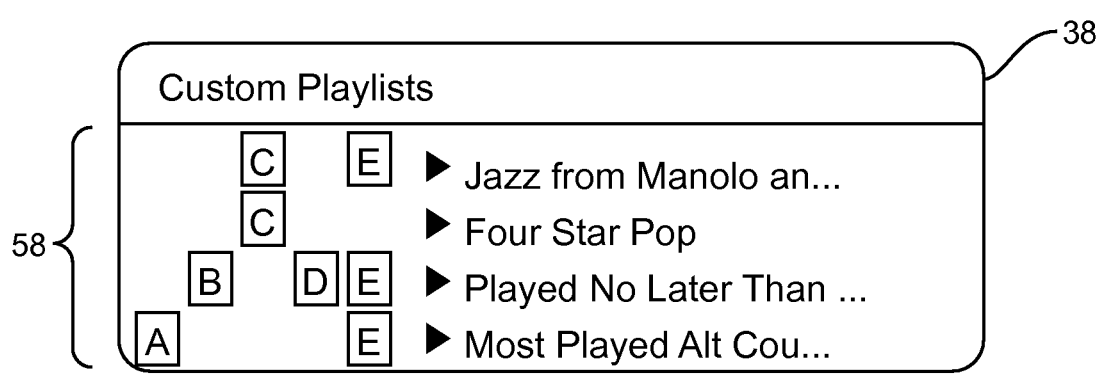

FIG. 3D is a blow-up of the custom playlists area 38 of FIG. 3A. One or more source indicators are presented in association with each custom playlist in a list of custom playlists 58 in order to identify the source or sources of the media items in the custom playlists. The source indicators presented in association with the custom playlists correspond to the source indicators 44-1 through 44-5 (FIG. 3B) assigned to the media collections selected for aggregation. As such, the user 14-1 can easily identify which sources contribute to each of the custom playlists. For example, the "Jazz from Manolo an . . ." playlist has only media items from the sources identified by the "C" source indicator and the "E" source indicator, which in this example are the "Manolo's Musica" and the "Fred's Place" shared media collections (FIG. 3B).

Figure 3E:
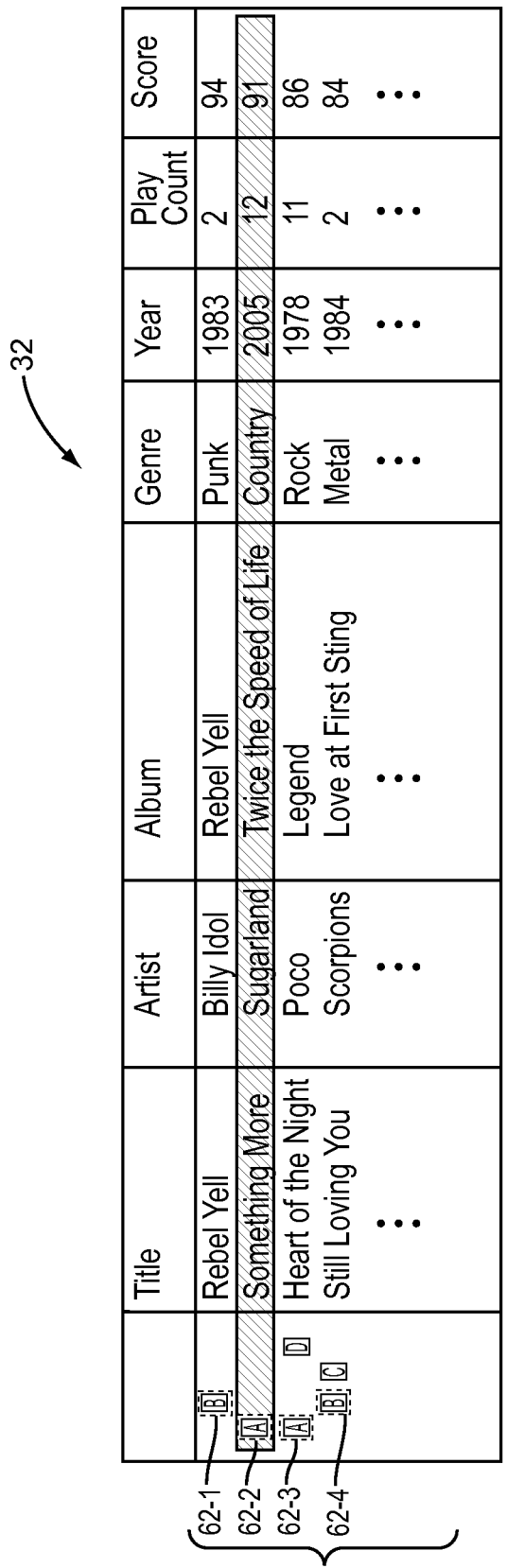

FIG. 3E illustrates a list of media items 60 presented in the display area 32 of FIG. 3A. One or more source indicators are presented in association with each media item in the list of media items 60 in order to identify the source or sources for the media items. Again, the source indicators presented in association with the media items correspond to the source indicators 44-1 through 44-5 (FIG. 3B) assigned to the media collections selected for aggregation. As such, the user 14-1 can easily identify the source or sources for each media item in the list of media items 60. For example, the song "Rebel Yell" has only one source identified by the source indicator "B," which in this example corresponds to the "Hank's Music" shared media collection. As another example, the song "Still Loving You" has two sources identified by the source indicator "B" and the source indicator "C," which in this example correspond to the "Hank's Music" and "Manolo's Musica" shared media collections. Further, indicators 62-1 through 62-4 are used to identify one source for each of the media items from which the media item is to be obtained or streamed. For example, the song "Still Loving You" is to be obtained from the user device hosting "Hank's Music," which is identified by the source indicator "B." In this example, the indicators 62-1 through 62-4 are dashed boxes placed around the source indicators of the sources from which the media items are to be obtained. However, the present invention is not limited thereto. Other types of indicators 62-1 through 62-4 may be used.

Returning briefly to FIG. 3A, optionally, a source indicator 64 may also be used as the thumb of a playback progress bar 66 in order to identify the source of the currently playing media item. In this example, the song "Something More" is currently playing, and the source of the song "Something More" is identified by the source indicator "A," which in this example is the local media collection 22-1 ("My Music") of the user 14-1.

Figure 4:
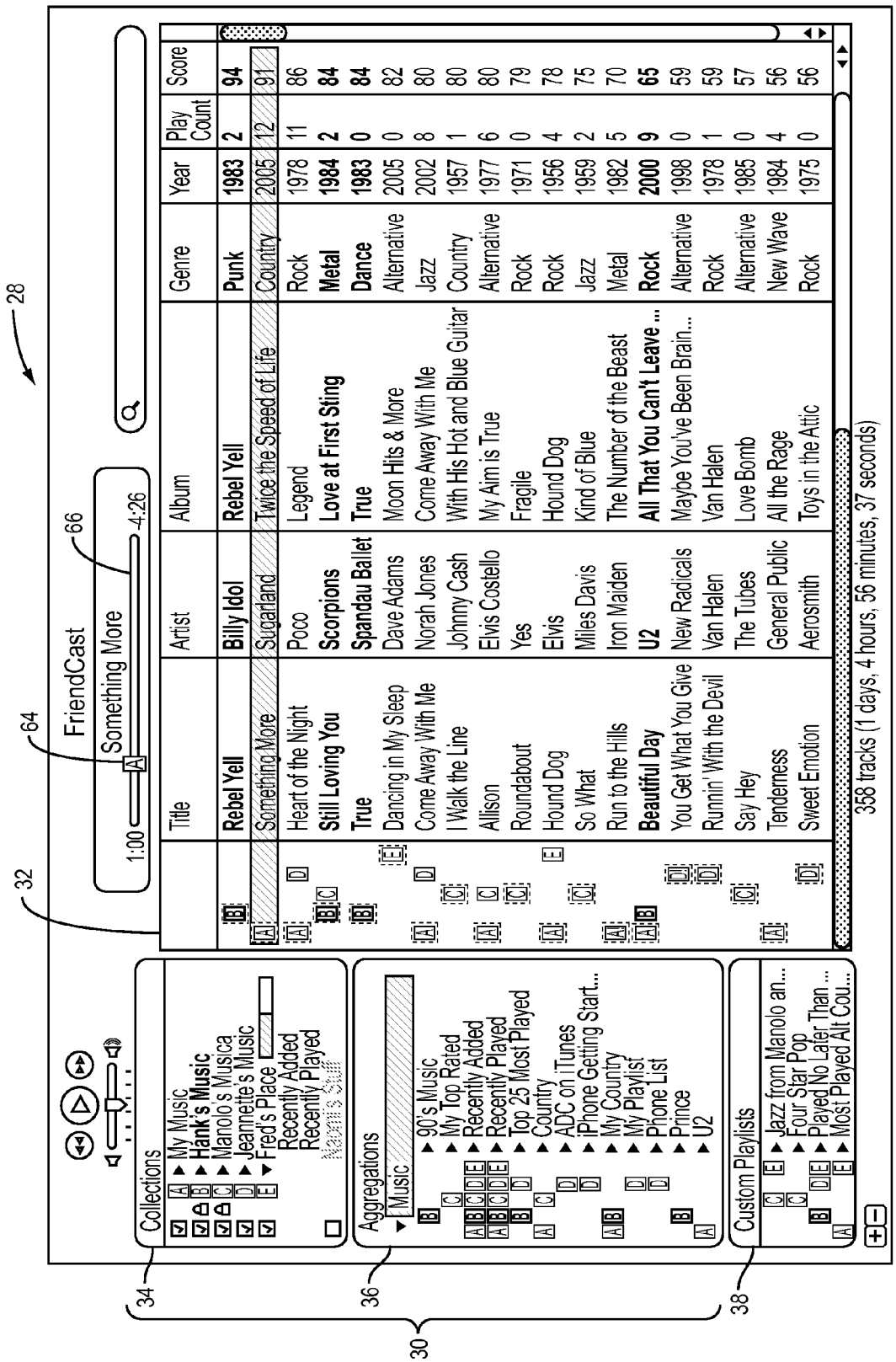
FIG. 4 illustrates an exemplary GUI wherein elements associated with a selected source are highlighted according to one embodiment of the present invention.

FIG. 4 illustrates another feature of the GUI 28 wherein elements of the aggregate media collection 24-1 of the user 14-1 associated with a select source are highlighted according to one embodiment of the present invention. In this example, the user 14-1 has selected the "Hank's Music" shared media collection identifier in the media collection selection area 34. As a result, all "B" source indicators are highlighted such that the user 14-1 is enabled to quickly identify aggregate playlists including media items for which "Hank's Music" is a source, custom playlists including media items for which "Hank's Music" is a source, and media items in the display area 32 for which "Hank's Music" is a source. Note that while the "B" source indicators are highlighted by making them bold in this exemplary embodiment, the present invention is not limited thereto. For example, if the source indicators are colored boxes rather than letters, the colored boxes operating as the source indicator for "Hank's Music" may be brightened. Further, the colored boxes operating as source indicators for the other sources may be dimmed.

Figure 5:
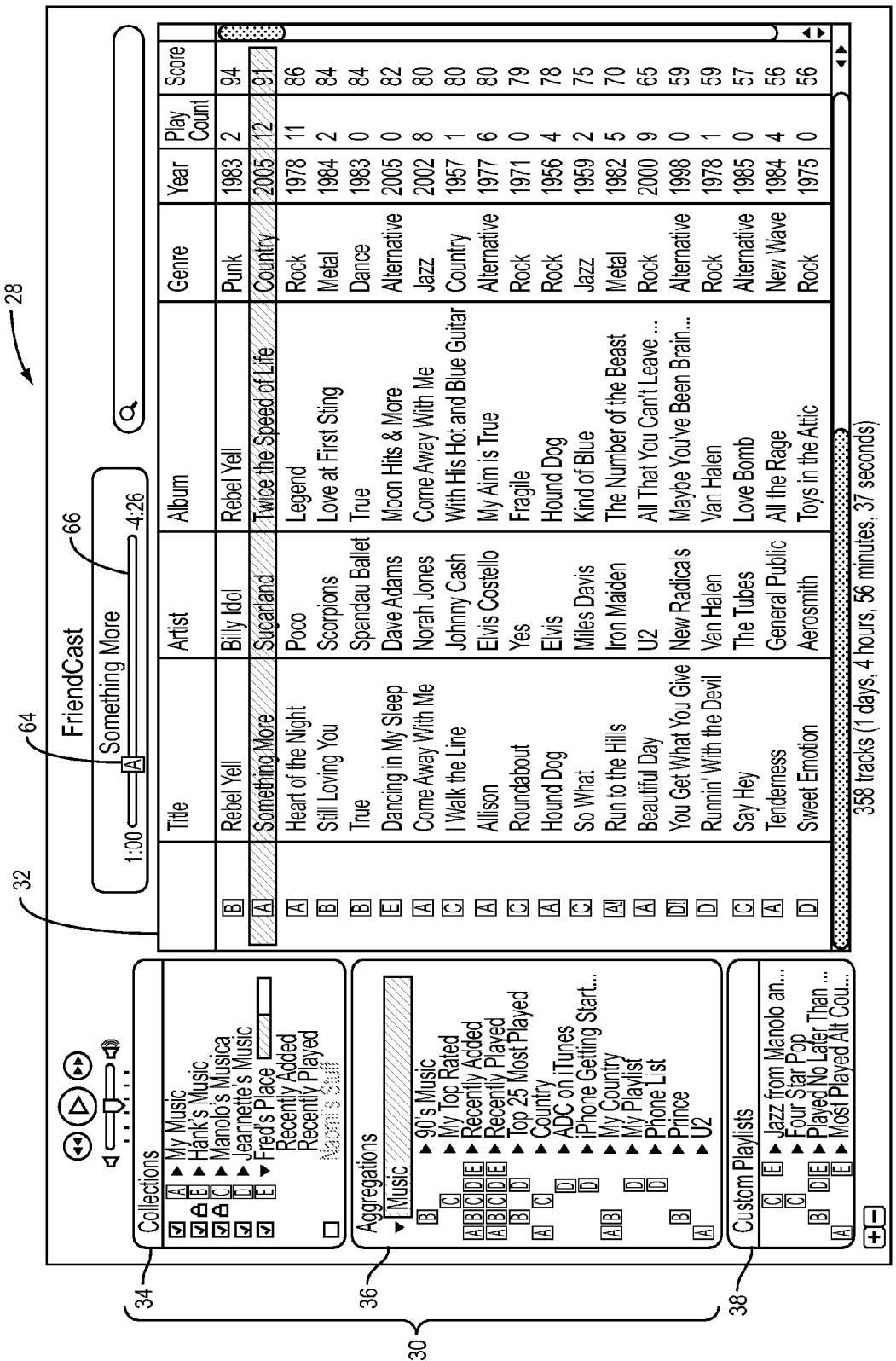
FIG. 5 illustrates an exemplary GUI including source indicators according to another embodiment of the present invention.

FIG. 5 illustrates the GUI 28 according to another embodiment of the present invention. In this embodiment, in the display area 32, only one source indicator is presented in association with each media item. More specifically, rather than presenting a source indicator for each source of a media item and then highlighting the source indicator of the source from which the media item is to be obtained, in this embodiment, only the source indicator for the source from which the media item is to be obtained is presented. Thus, for example, in this embodiment, the song "Still Loving You" will be obtained from the user device hosting the "Hank's Music" shared media collection as indicated by the "B" source indicator.

Figure 6:
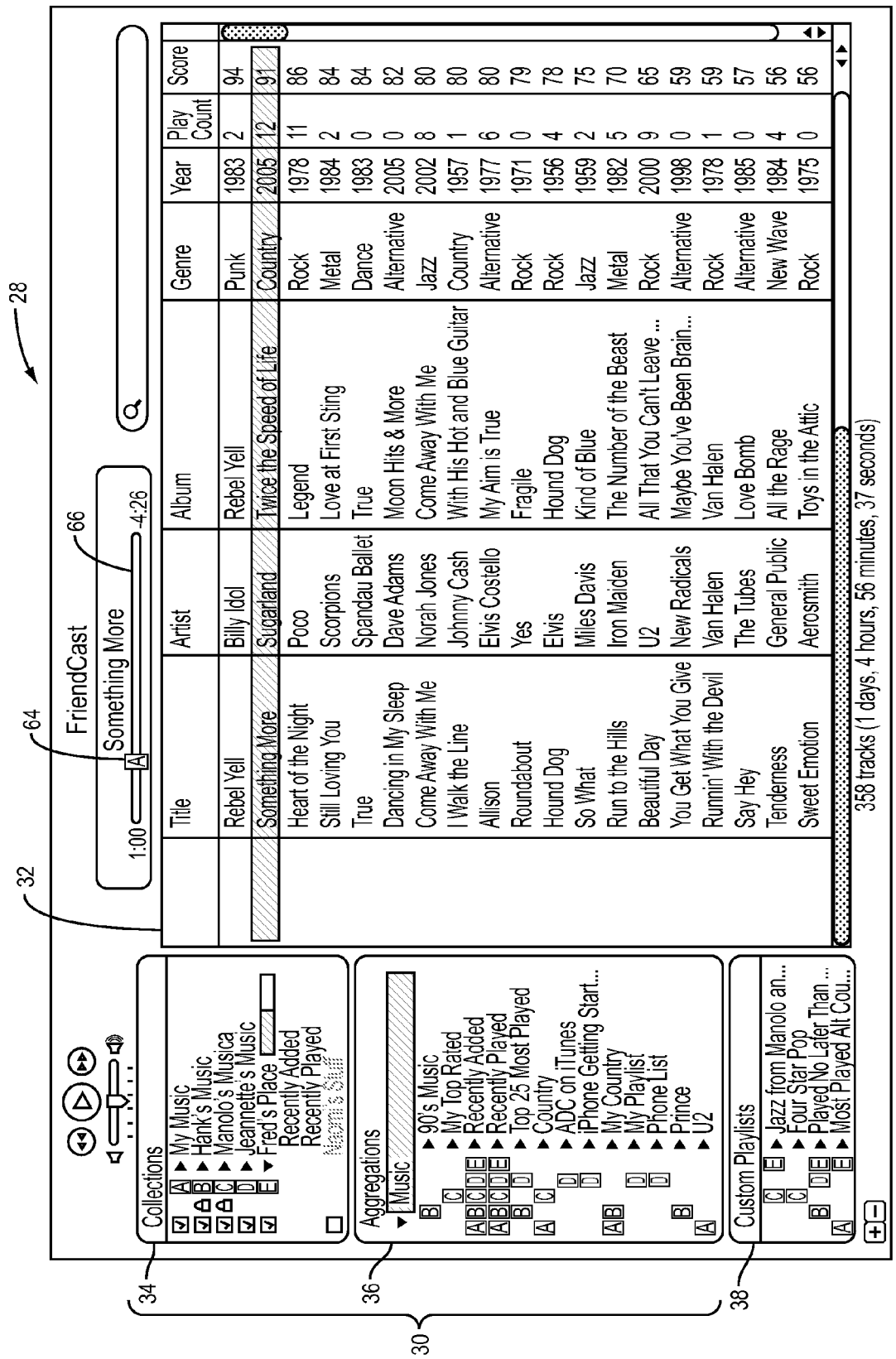
FIG. 6 illustrates an exemplary GUI including source indicators according to yet another embodiment of the present invention.

FIG. 6 illustrates the GUI 28 according to yet another embodiment of the present invention. In this embodiment, source indicators are not presented in association with the media items in the display area 32. However, the source indicator 64 for the currently playing song is presented as the thumb of the playback progress bar 66. In another embodiment, if the currently playing media item is available from multiple sources, the thumb of the playback progress bar 66 may include the source indicator for each of those sources. In addition, the thumb of the playback progress bar 66 may include other identifiers such as, for example, a dashed box around the source indicator of the source from which the media item is being obtained.

Figure 7:
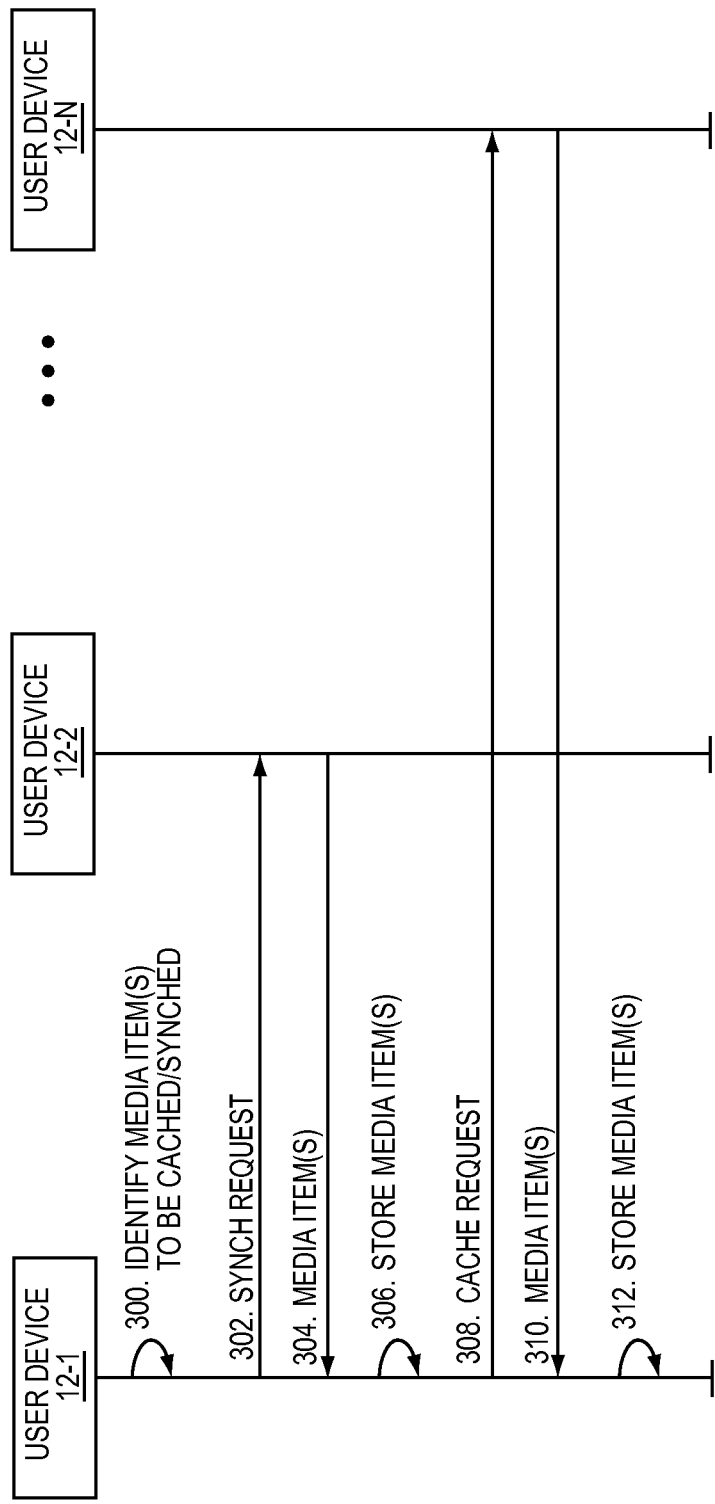
FIG. 7 illustrates a caching or synching process according to one embodiment of the present invention.

FIG. 7 illustrates a caching and synchronization (synching) process according to one embodiment of the present invention. As discussed above, shared media items are preferably delivered via streaming. However, in this embodiment, some media items may be proactively cached such that the shared media items are temporarily available in at least a limited form even if the user device hosting the corresponding shared media collection becomes unavailable by, for example, going offline, disabling sharing, or the like. In addition, one or more of the shared media collections selected for aggregation may be owned by the user 14-1 and hosted by another user device of the user 14-1. As used herein, a media item is owned by the user 14-1 if the user 14-1 has purchased the media item or has otherwise obtained access rights to the media item via, for example, a subscription service. As such, one or more media items owned by the user 14-1 and included in a shared media collection hosted by another user device may be manually or automatically selected for synching to the user device 12-1.

More specifically, in this example, the aggregation function 20-1, or the media player function 18-1, of the user device 12-1 first identifies one or more media items to be cached or synched to the user device 12-1 (step 300). As discussed below, in one embodiment, the user 14-1 selects playlists and/or individual media items to cache or synch to the user device 12-2. In another embodiment, media items are scored based on user preferences of the user 14-1. Media items having scores greater than a defined threshold score are then automatically selected to be cached or synched to the user device 12-1. Note that whether a media item is cached or synched depends on whether that media item is or is not from a shared media collection owned by the user 14-1. Media items from shared media collections that are not owned by the user 14-1 are cached to the user device 12-1 such that the user 14-1 has limited access rights to those media items. Media items from shared media collections that are owned by the user 14-1 may be synched to the user device 12-1 such that the user 14-1 has unlimited access rights to those media items. Note that in an alternative embodiment, media items from shared media collections may be cached at the user device 12-1 such that the user has limited access rights to those media items regardless of whether the corresponding shared media collections are or are not owned by the user 14-1.

In this example, the shared media collection hosted by the user device 12-2 is owned by the user 14-1 (i.e., the user 14-1 and the user 14-2 are the same user), and one or more media items from the shared media collection hosted by the user device 12-2 are selected for synching. Note that the shared media collection hosted by the user device 12-2 may appear in the media collection selection area 36 (FIG. 3A) of the GUI 28 like other shared media collections. Upon selection of the shared media collection hosted by the user device 12-2 for aggregation, credentials of the user 14-1, such as a synching password, may be used to prove ownership of the shared media collection hosted by the user device 12-2 to enable synching.

In order to obtain the one or more media items identified for synching, the aggregation function 20-1, or the media player function 18-1, of the user device 12-1 sends a request to the user device 12-2 for the one or more media items to be synched to the user device 12-1 (step 302). In response, the aggregation function 20-2, or the media player function 18-2, of the user device 12-2 returns the one or more requested media items to the user device 12-1 (step 304). The one or more media items obtained from the user device 12-2 are stored at the user device 12-1 (step 306). Note that the synched media items may be marked or flagged as owned by the user 14-1 such that the user 14-1 has unlimited access rights to the synced media items. In addition or alternatively, the synched media items may be added to the local media collection 22-1 of the user device 12-1.

In addition, one or more media items from a shared media collection hosted by the user device 12-N and not being owned by the user 14-1 are selected for caching. As such, the aggregation function 20-1, or the media player function 18-1, of the user device 12-1 sends a request to the user device 12-N for the one or more media items to be cached at the user device 12-1 (step 308). In response, the aggregation function 20-N, or the media player function 18-N, of the user device 12-N returns the one or more requested media items to the user device 12-1 (step 310), and the one or more media items are stored in the cache 26-1 of the user device 12-1 (step 312). Note that in the preferred embodiment, the user 14-1 has limited access rights to the cached media items. For example, playback of each cached media item may be limited to a maximum play count of five (5). As another example, only previews of the cached media items, rather than the complete media items, may be available to the user 14-1 unless the user 14-1 thereafter purchases the cached media items. The previews of the cached media items may be obtained and stored in the cache 26-1 of the user device 12-1. Alternatively, complete versions of the cached media items may be obtained and stored at the user device 12-1, wherein the previews of the cached media items may be generated by the aggregation function 20-1 of the media player function 18-1.

Figure 8A:
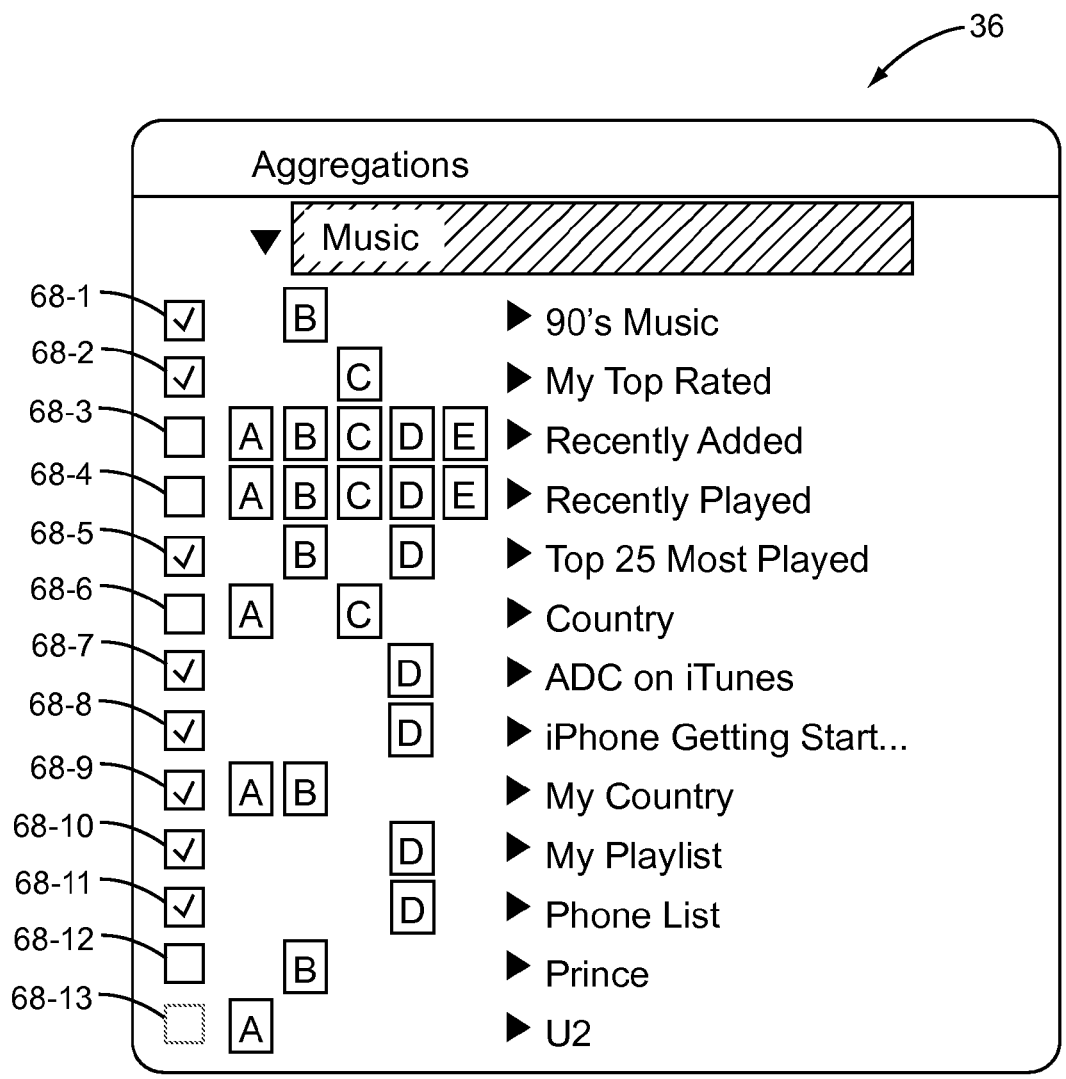
FIGS. 8A through 8C illustrate an exemplary GUI enabling a user to manually select media items to cache or synch according to one embodiment of the present invention.
Figure 8B:
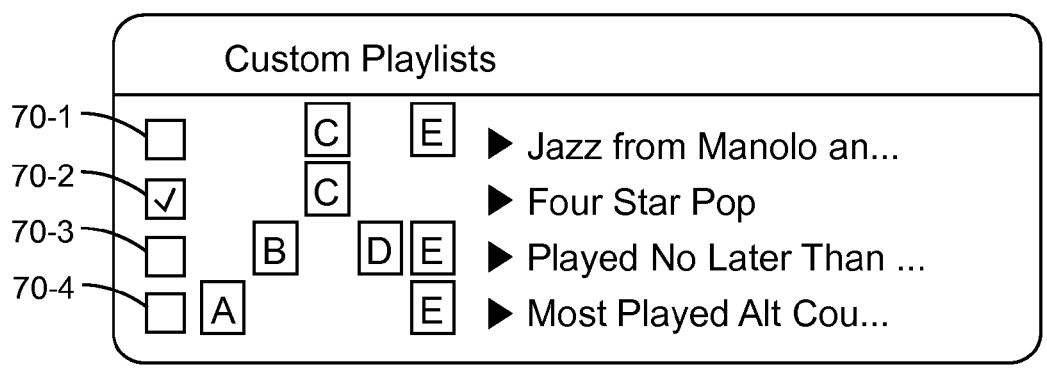
Figure 8C:
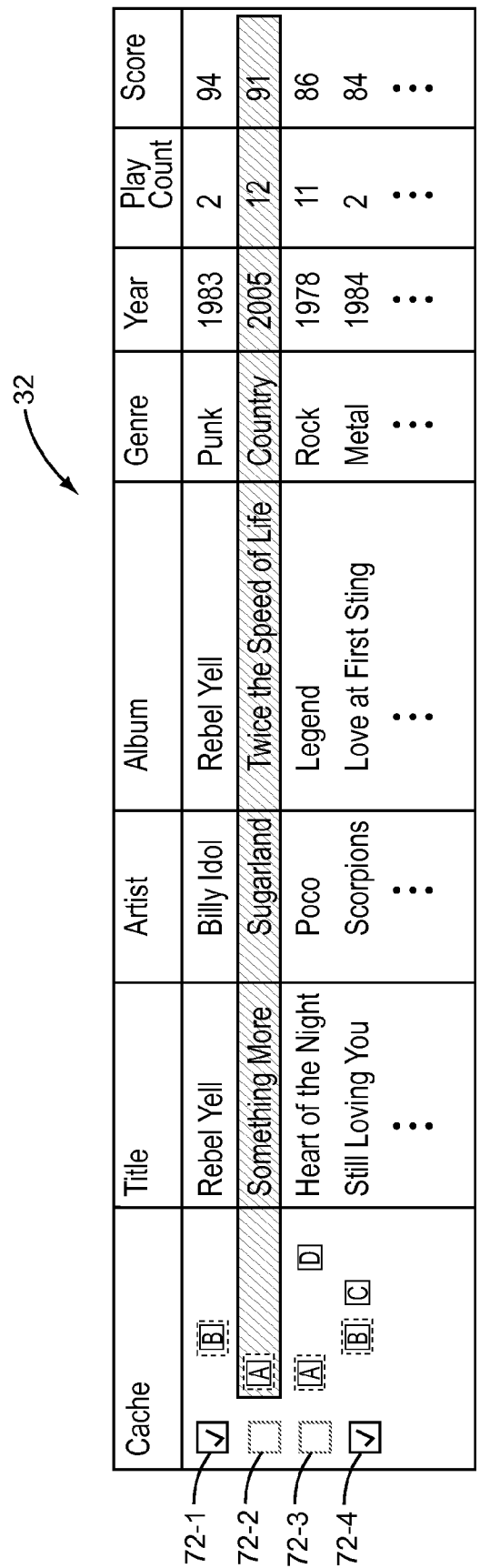

FIGS. 8A through 8C illustrate modified versions of the playlist selection area 36, the custom playlists area 38, and the display area 32 of the GUI 28 (FIG. 3A) that enable the user 14-1 to select media items to be cached or synched according to one embodiment of the present invention. FIG. 8A illustrates a modified version of the playlist selection area 36 of the GUI 28 that further comprises check boxes 68-1 through 68-13 enabling the user 14-1 to select aggregate playlists to cache or synch. Once an aggregate playlist is selected by the user 14-1, shared media items in the aggregate playlist are identified as media items to be cached or synched. Again, in this embodiment, media items to be sourced from a shared media collection owned by the user 14-1 are synched, and media items to be sourced from a shared media collection not owned by the user 14-1 are cached. Thus, in this example, the user 14-1 has selected the "90's Music," "My Top Rated," and "Top 25 Most Played" aggregate playlists by selecting the check boxes 68-1, 68-2, and 68-5. As such, all shared media items included in the "90's Music," "My Top Rated," and "Top 25 Most Played" aggregate playlists are identified as media items to be cached or synched depending on the sources from which the media items are to be obtained. Then, as discussed above, the identified media items are obtained from the user device(s) hosting the corresponding shared media collections and stored at the user device 12-1. Note that media items from the local media collection 22-1 that are already stored at the user device 12-1 do not need to be cached or synched. As such, in this example, the check box 68-13 is grayed-out since the "U2" playlist includes only media items from the local media collection 22-1 that are stored locally at the user device 12-1.

FIG. 8B illustrates a modified version of the custom playlists area 38 of the GUI 28 that further comprises check boxes 70-1 through 70-4 enabling the user 14-1 to select custom playlists to cache or synch. Once a custom playlist is selected by the user 14-1, shared media items in the shared playlist are identified as media items to be cached or synched depending on the sources of the media items. Thus, in this example, the user 14-1 has selected the "Four Star Pop" custom playlist by selecting the check box 70-2. As such, all shared media items included in the "Four Star Pop" custom playlist are identified as media items to be cached or synched. Then, as discussed above, the identified media items are obtained from the user device(s) hosting the corresponding shared media collections and stored at the user device 12-1.

FIG. 8C illustrates a modified version of the display area 32 of the GUI 28 that further comprises check boxes 72-1, 72-2, et seq. to select media items to cache or synch. The media items selected by the user 14-1 are identified as media items to be cached or synched depending on the sources of the media items. Then, as discussed above, the identified media items are obtained from the user device(s) hosting the corresponding shared media collections and stored at the user device 12-1. Note that the check boxes 72-2 and 72-3 are grayed out since the songs "Something More" and "Heart of the Night" are already included in the local media collection 22-1 of the user 14-1.

Figure 9A:
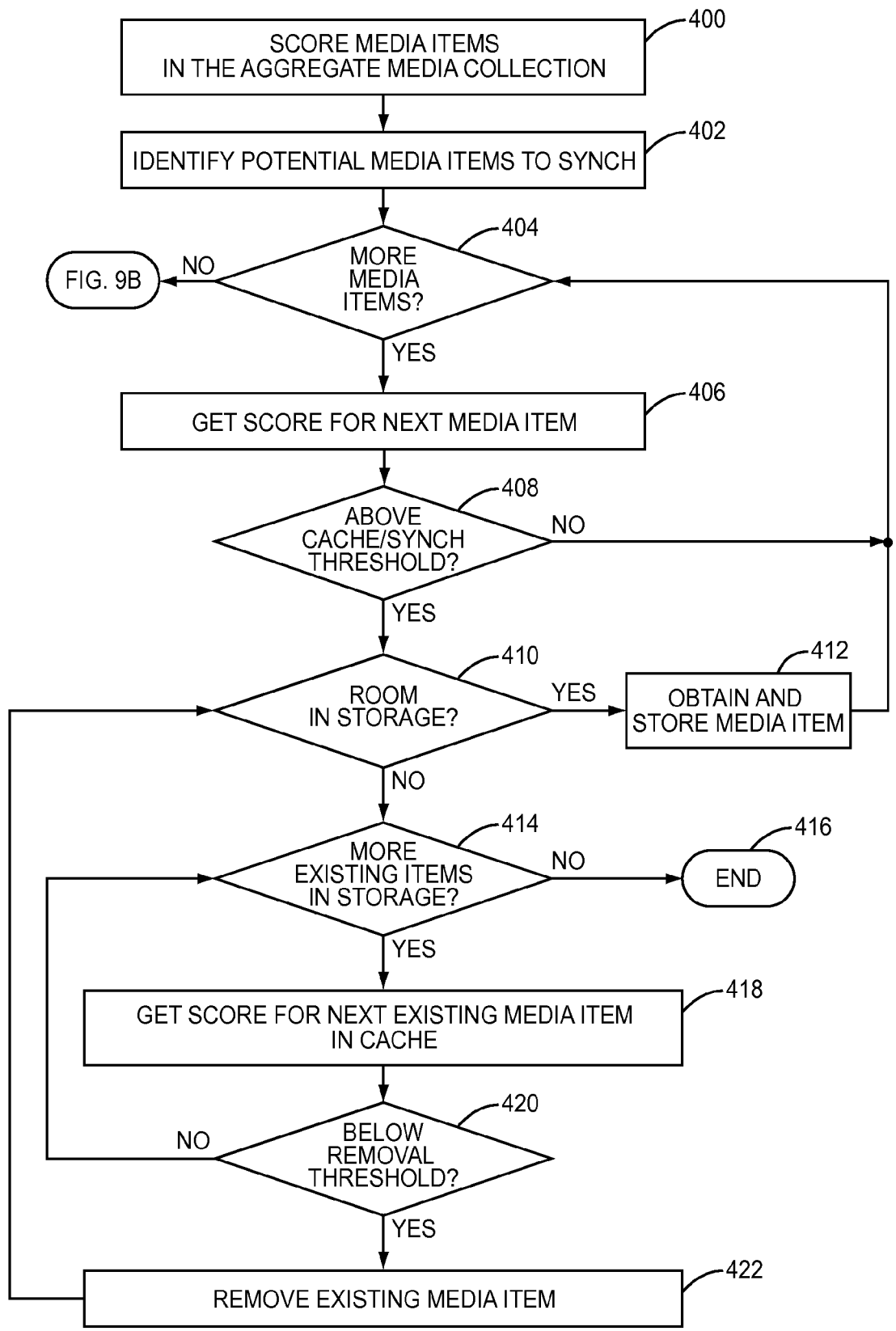
FIGS. 9A and 9B illustrates an auto caching and synching process according to one embodiment of the present invention.
Figure 9B:
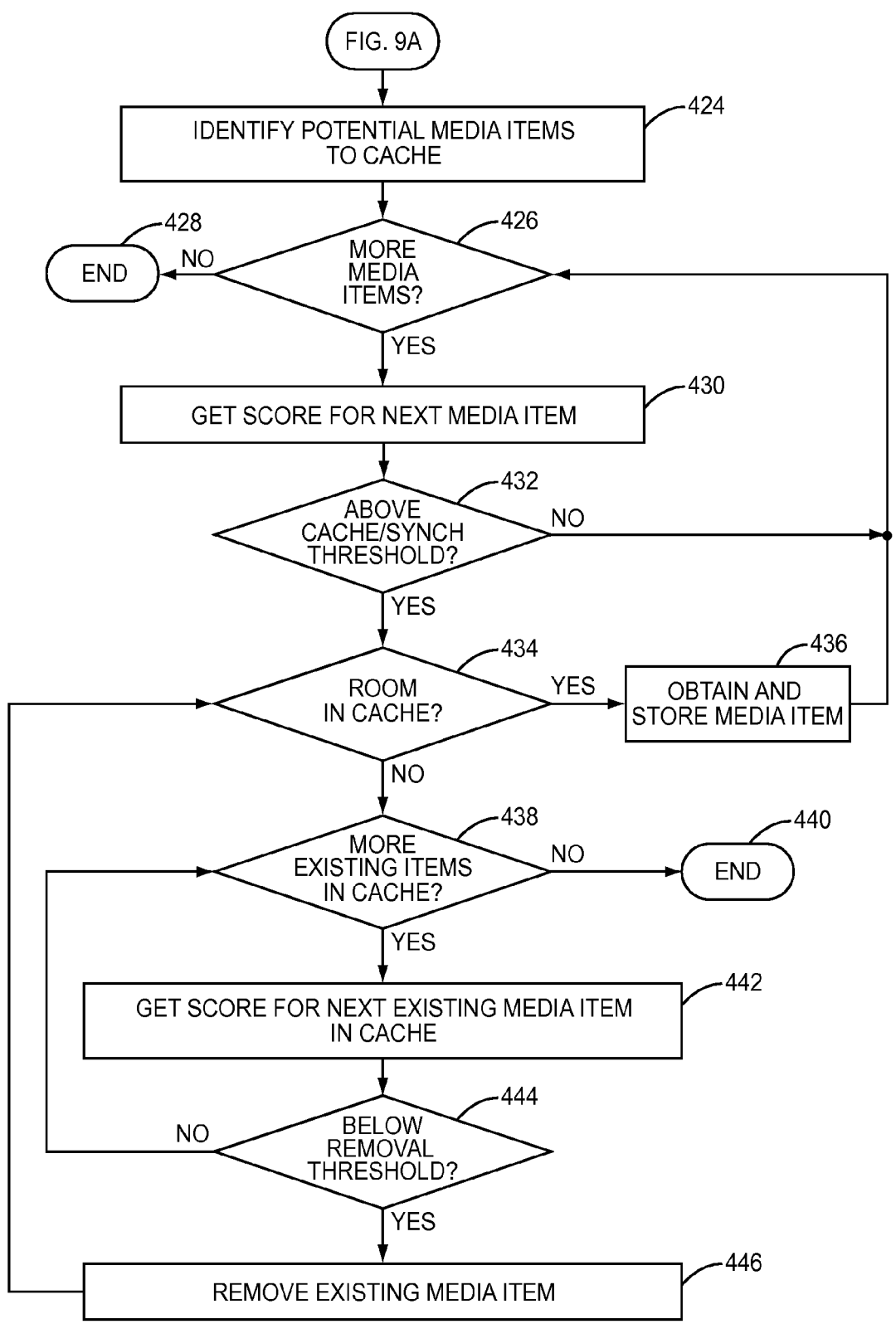

FIGS. 9A and 9B provide a flow chart illustrating a process for automatically synching and caching media items according to one embodiment of the present invention. First, the media items in the aggregate media collection 24-1 of the user 14-1 are scored (step 400). Note that, in this example, all of the media items in the aggregate media collection 24-1 of the user 14-1 are scored. However, the present invention is not limited thereto. For example, in an alternative embodiment, only media items in a currently selected playlist from the playlist selection area 36 (FIG. 3A) may be scored.

In the preferred embodiment, the media items are scored based on user preferences of the user 14-1. In one embodiment, the user preferences include weights assigned to a number of categories of media item attributes and weights assigned to a number of media item attributes for each category. Using songs as an example, the user preferences may include weights assigned to categories such as a genre category, a decade category, a source category, or the like. Then, for each category, weights may be assigned to a number of possible attributes for that category. For example, for the genre category, weights may be assigned to a number of genres such as Rock, Country, Jazz, or the like. Based on the user preferences and metadata describing attributes of the media items, the media items are scored. For a more detailed discussion of an exemplary scoring process, the interested reader is directed to U.S. Patent Application Publication No. 2008/0016205, entitled P2P NETWORK FOR PROVIDING REAL TIME MEDIA RECOMMENDATIONS, which was filed on Jul. 11, 2006, published on Jan. 17, 2008, and is hereby incorporated herein by reference in its entirety.

Next, potential media items to synch to the user device 12-1 are identified from the aggregate media collection 24-1 of the user 14-1 (step 402). More specifically, media items from one or more shared media collections owned by the user 14-1 and hosted by other user devices are identified as potential media items to synch. A determination is made as to whether there are more potential media items to synch to be processed (step 404). If not, the process proceeds step 424 to FIG. 9B. If there are more media items to be processed, the score for the next potential media item to synch is obtained (step 406), and a determination is made as to whether the score is above a cache/synch threshold (hereinafter "threshold") (step 408). If not, the process returns to step 404 and is repeated. If the score is above the threshold, a determination is made as to whether there is room to store the media item at the user device 12-1 (step 410). If so, the media item is obtained from the user device hosting the corresponding shared media collection and stored at the user device 12-1 (step 412). At this point, the process returns to step 404.

If there is not room to store the media item at the user device 12-1, a removal process is performed. Note that, in this embodiment, the cache 26-1 is a portion of a storage device of the user device 12-1 that may be used to cache shared media items. When additional storage is needed for synched media items or the local media collection 22-1, media items may be removed from the portion of the storage device used as the cache 26-1 in order to make room for additional synched media items or media items in the local media collection 22-1. More specifically, in this embodiment, a determination is made as to whether there are existing media items in the cache 26-1 of the user device 12-1 (step 414). If not, the process ends (step 416). If there are media items in the cache 26-1 of the user device 12-1, the score for the next existing media item in the cache 26-1 of the user device 12-1 is obtained (step 418), and a determination is made as to whether the score is below an auto-removal threshold (step 420). If not, the process returns to step 414 and is repeated. If the score is below the auto-removal threshold, the existing media item is removed from the cache 26-1 of the user device 12-1 (step 422), and the process returns to step 410 and is repeated.

Returning to step 404, once all of the potential media items to synch have been processed, the process proceeds to FIG. 9B. At this point, potential media items to cache are identified from the aggregate media collection (step 424). More specifically, the potential media items to cache are media items from the aggregate media collection 24-1 of the user 14-1 whose sources are shared media collections that are not owned by the user 14-1 and are hosted by other user devices. A determination is then made as to whether there are more potential media items to cache to be processed (step 426). If not, the process ends (step 428). If there are more media items to be processed, the score for the next potential media item to cache is obtained (step 430), and a determination is made as to whether the score is above the cache/synch threshold (hereinafter "threshold") (step 432). Note that in this example, the cache and synch thresholds are the same. However, the present invention is not limited thereto. If the score is not above the threshold, the process returns to step 426 and is repeated. If the score is above the threshold, a determination is made as to whether there is room for the media item in the cache 26-1 of the user device 12-1 (step 434). If so, the media item is obtained from the user device hosting the corresponding shared media collection and stored in the cache 26-1 of the user device 12-1 (step 436). At this point, the process returns to step 404.

If there is not room in the cache 26-1 of the user device 12-1 for the media item, a removal process is performed. More specifically, a determination is made as to whether there are more existing media items in the cache 26-1 of the user device 12-1 (step 438). If not, the process ends (step 440). If there are more media items in the cache 26-1 of the user device 12-1, the score for the next existing media item in the cache 26-1 of the user device 12-1 (step 442), and a determination is made as to whether the score is below the auto-removal threshold (step 444). In this example, the auto-removal threshold is the same for cached and synched media items. However, the present invention is not limited thereto. If the score is not below the auto-removal threshold, the process returns to step 438 and is repeated. If the score is below the auto-removal threshold, the existing media item is removed from the cache 26-1 of the user device 12-1 (step 446), and the process returns to step 434 and is repeated.

Figure 10:
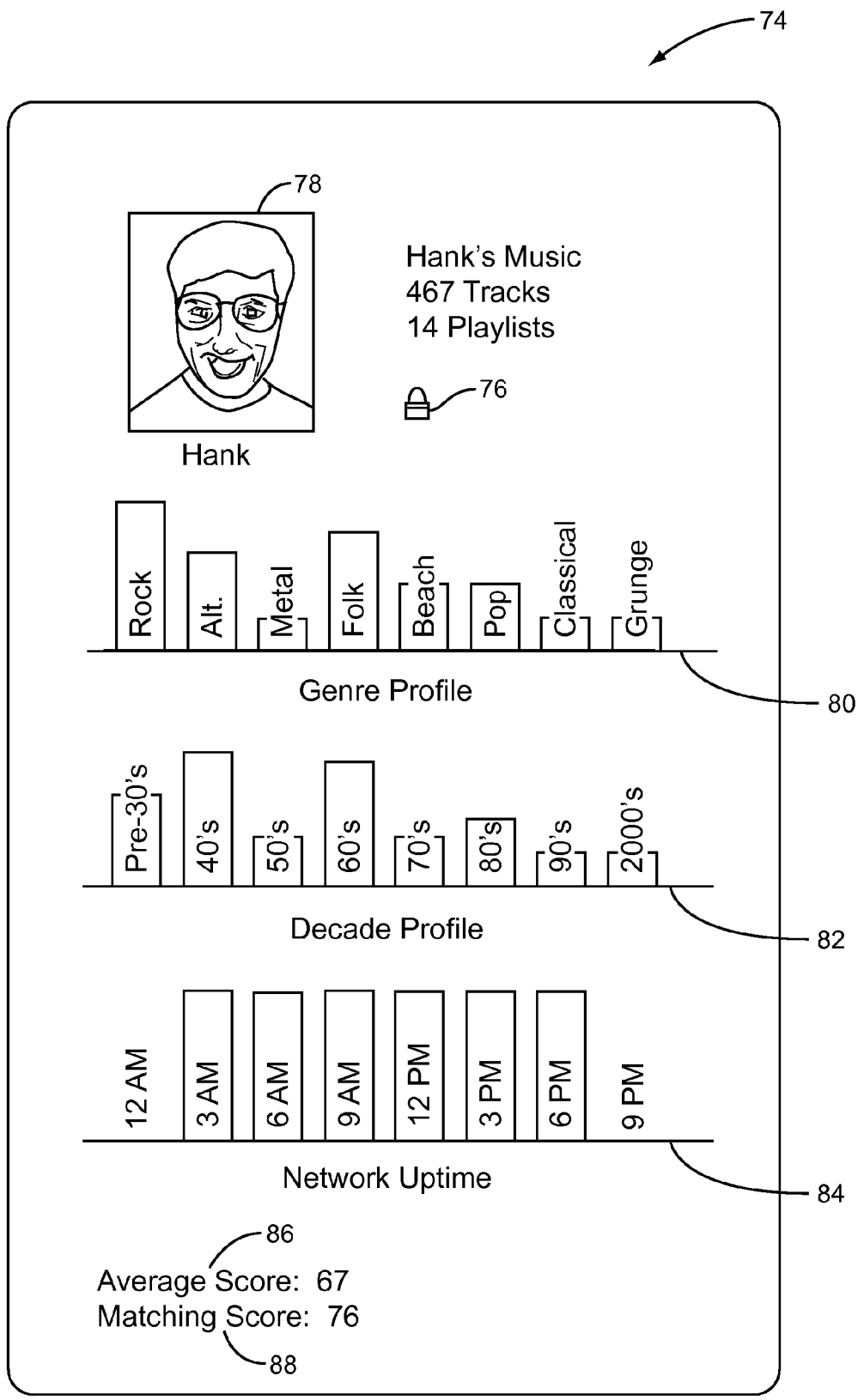
FIG. 10 illustrates a collection digest according to one embodiment of the present invention.
Figure 11:
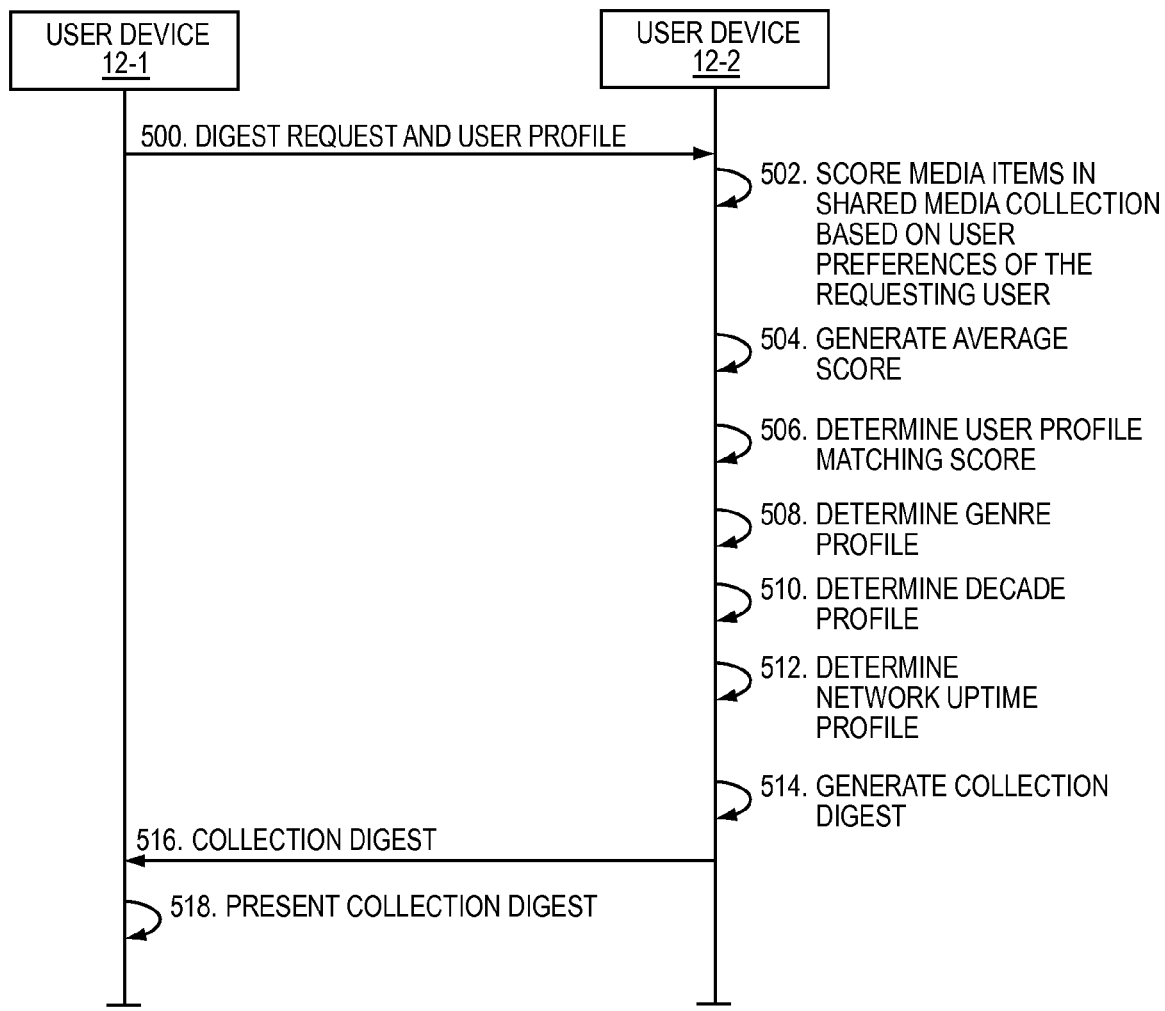
FIG. 11 illustrates a process for obtaining a collection digest according to one embodiment of the present invention.

FIGS. 10 and 11 illustrate another optional feature that may be provided in order to assist, for example, the user 14-1 in deciding which media collections to select for aggregation. More specifically, in this embodiment, the user 14-1 is enabled to view a collection digest for each of the media collections available for aggregation by, for example, clicking on or otherwise selecting the corresponding media collection identifiers in the GUI 28 (FIG. 3A). This feature is provided so that a receiving user can determine the desirability of a shared media collection prior to incurring the overhead of aggregation. This is especially desirable for shared media collections that are large.

FIG. 10 illustrates an exemplary collection digest 74 for the "Hank's Music" shared media collection. As illustrated, the collection digest 74 includes a name or identifier of the media collection; a total number of media items, which in this example are songs or tracks, in the shared media collection; a number of playlists in the shared media collection; an indicator 76 indicating that the shared media collection is password protected; an image 78 of the sharing user; a genre profile 80; a decade profile 82; a network uptime profile 84; an average score 86; and a matching score 88. The genre profile 80 is indicative of the number or percentage of media items in the shared media collection from each of a number of genres. Likewise, the decade profile 82 is indicative of the number or percentage of media items in the shared media collection released in each of a number of decades or time periods. The network uptime profile 84 is indicative of times of day during which the shared media collection has historically been available or shared. Note that the collection digest 74 is exemplary and not intended to limit the scope of the present invention. The collection digest 74 may include any type of information summarizing the shared media collection of the sharing user in a manner that assists the user 14-1 in deciding whether to select the shared media collection for aggregation. As discussed below, the average score 86 is an average score of media items in the "Hank's Music" shared media collection based on user preferences of the user 14-1. The matching score 88 is indicative of a degree to which a user profile of the user 14-1 matches a user profile of the user sharing the "Hank's Music" shared media collection.

FIG. 11 illustrates the operation of the media sharing system 10 to provide collection digests, such as the collection digest 74 of FIG. 10, according to one embodiment of the present invention. First, the aggregation function 20-1 of the user device 12-1 sends a request to a user device hosting an available shared media collection, which in this example is the user device 12-2 (step 500). The request may be provided automatically upon initially discovering the shared media collection hosted by the user device 12-2. Alternatively, the request may be provided to the user device 12-2 in response to user input from the user 14-1 at the user device 12-1. In this embodiment, a user profile of the user 14-1 is provided to the user device 12-2 as part of the request or in association with the request. In this example, the user profile of the user 14-1 includes the user preferences of the user 14-1 used to score media items for the user 14-1 as well as information describing the user 14-1 and/or the shared media collection of the user 14-1. The information describing the user 14-1 may include demographic information such as, for example, age, gender, geographic location, or the like. The information describing the shared media collection of the user 14-1 may include, for example, a genre profile, a decade profile, a network uptime profile, or the like.

The aggregation function 20-2 of the user device 12-2 then scores the media items in the shared media collection hosted by the user device 12-2 based on the user preferences of the user 14-1 (step 502). In this example, the aggregation function 20-2 of the user device 12-2 then averages the scores of the media items generated in step 502 to provide an average score (step 504). The aggregation function 20-2 of the user device 12-2 also compares the user profile of the user 14-1 and the user profile of the user 14-2 to provide a matching score indicative of a degree to which the user profile of the user 14-1 matches the user profile of the user 14-2 (step 506). Note that any known user profile matching technique may be used. In this example, the shared media collection is a shared music collection. As such, the aggregation function 20-2 of the user device 12-2 also generates a genre profile and a decade profile for the shared media collection of the user device 12-2 (steps 508 and 510). The aggregation function 20-2 of the user device 12-2 also determines or generates a network uptime profile for the shared media collection that is indicative of whether the shared media collection has historically been available for each of a number of periods of time during the day (step 512).

The aggregation function 20-2 of the user device 12-2 then generates a collection digest for the shared media collection hosted by the user device 12-2 (step 514). In this exemplary embodiment, the collection digest includes the average score of the media items in the shared media collection based on the user preferences of the user 14-1, the user profile matching score, the genre profile, the decade profile, and the network uptime profile. In addition, the collection digest may include the number of media items in the shared media collection, an identifier of the shared media collection, an image of the sharing user 14-2, an indication as to whether the shared media collection is password protected, or the like.

The aggregation function 20-2 of the user device 12-2 then returns the collection digest to the user device 12-1 (step 516). The aggregation function 20-1 of the user device 12-1 then presents the collection digest to the user 14-1 (step 518). More specifically, if the request for the collection digest was initiated by the user 14-1, then the collection digest may automatically be presented to the user 14-1. If the request for the collection digest was initiated automatically in response to, for example, discovering the shared media collection hosted by the user device 12-2, then the collection digest may be stored and presented to the user 14-1 upon request. For example, the collection digest may be presented when the user 14-1 causes a pointing device (e.g., mouse cursor) to hover over the identifier of the shared media collection in the GUI 28 (FIG. 3A). Note that while FIG. 11 only illustrates a process for the user device 12-1 obtaining a collection digest of a single shared media collection, the same process may be used by all of the user devices 12-1 through 12-N to obtain collection digests for available shared media collections.

FIGS. 10 and 11 are exemplary. In another embodiment, the user device 12-1 may provide one or more pre-filtering criteria to the user device 12-2 to be applied with respect to the generating of the collection digest for the shared media collection hosted by the user device 12-2. For example, the pre-filtering criteria may state that the media items in the shared media collection hosted by the user device 12-2 are to be scored based on the user preferences of the user 14-1 of the user device 12-1 and that the collection digest for the shared media collection hosted by the user device 12-2 is to include information identifying the five highest scored media items from the shared media collection hosted by the user device 12-2 and their scores. As another example, the pre-filtering criteria may be criteria used to filter the shared media collection hosted by the user device 12-2. For instance, the criteria may be one or more preferred genres, one or more preferred time periods, or the like. The media items in the filtered shared media collection may then be scored based on the user preferences of the user 14-1 of the user device 12-1, and an average of those scores may be determined and included in the collection digest.

Figure 12:
FIG. 12 is a GUI illustrating the selection of a media item for the initiation of a bridging process according to one embodiment of the present invention.
Figure 13:
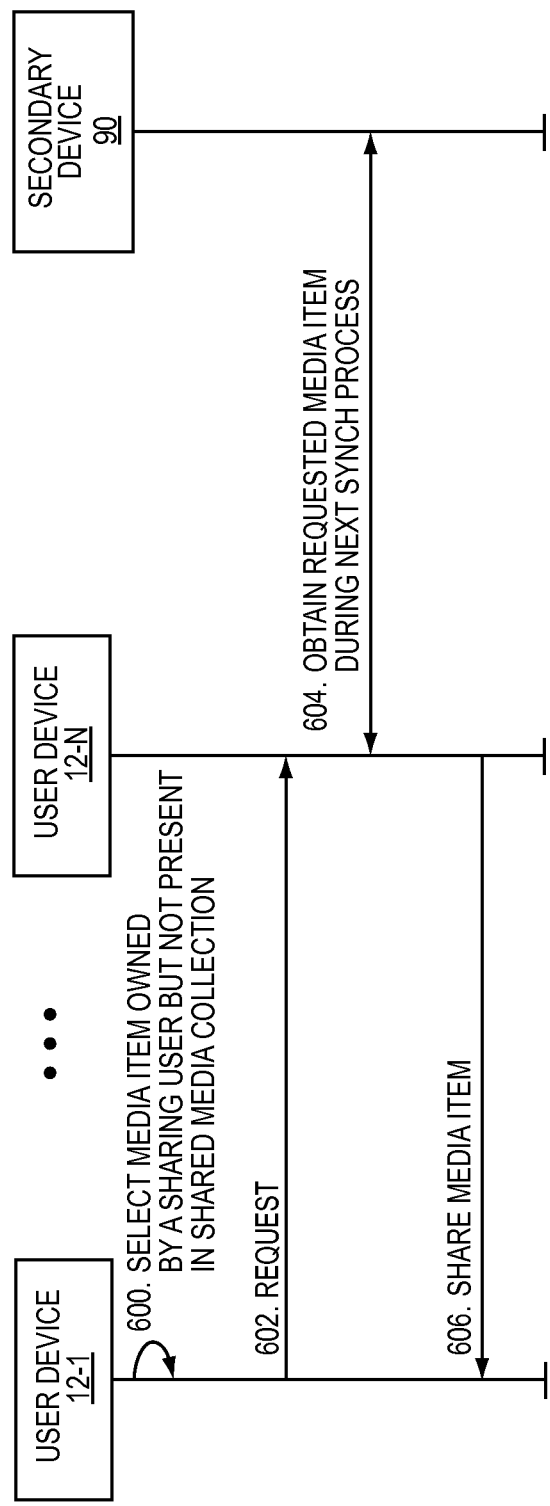
FIG. 13 illustrates a bridging process according to one embodiment of the present invention.

FIGS. 12 and 13 illustrate a bridging feature according to another embodiment of the present invention. Using the user device 12-N as an example, the local media collection 22-N of the user device 12-N may include media items owned by the user 14-N and stored locally at the user device 12-N. In addition, the local media collection 22-N may include information, or fingerprints, identifying media items owned by the user 14-N but stored remotely on a secondary device. For example, the user device 12-N may be a mobile device such as an Apple® iPhone® and the secondary device may be a personal computer of the user 14-N. As such, if the user 14-1 selects the shared media collection hosted by the user device 12-N for aggregation, the aggregate media collection 24-1 of the user 14-1 may include media items from the shared media collection of the user 14-N that are not stored on the user device 12-N. As such, FIGS. 12 and 13 describe a process by which the user device 12-1 may request that the user device 12-N operate as a bridge for media items from the shared media collection of the user device 12-N that are not stored on the user device 12-N but are instead stored on a secondary device of the user 14-N.

FIG. 12 illustrates on exemplary embodiment of how the user 14-1 can select a media item to be obtained via a bridging process. In this example, the song "You Get What You Give" is from the shared media collection identified by the source indicator "D," which corresponds to the "Jeannette's Music" shared media collection (FIG. 3B). Note that the exclamation point "!" beside the "D" in the source indicator indicates that the song "You Get What You Give" is from the shared media collection "Jeanette's Music" but is not currently stored on the corresponding user device. By selecting the song "You Get What You Give" for caching, the user 14-1 initiates a bridging process by which the song "You Get What You Give" will be obtained and cached by the user device 12-1. Note that the bridging process may be initiated in other manners and is not limited to the example of FIG. 12.

FIG. 13 illustrates an exemplary bridging process. First, a media item included in the shared media collection of the user device 12-N that is owned by the user 14-N but not currently stored on the user device 12-N is selected (step 600). Continuing the example of FIG. 12, assume that the song "You Get What You Give" from the shared media collection hosted by the user device 12-N is selected. Again, the selection of the media item may be, for example, the selection of the song for caching either manually, via an automatic caching process, or the like. However, the present invention is not limited thereto. The aggregation function 20-1, or the media player function 18-1, of the user device 12-1 then sends a request for the selected media item, which in this example is the song "You Get What You Give," to the user device 12-N (step 602). Since the selected media item is not currently stored on the user device 12-N, the aggregation function 20-N, or the media player function 18-N, of the user device 12-N identifies the selected media item as a media item to obtain from a secondary device 90 of the user 14-N on which the selected media item is stored.

Thereafter, during a subsequent synchronization process between the user device 12-N and the secondary device 90, the user device 12-N obtains the selected media item from the secondary device 90 (step 604). Note that the secondary device 90 may be one of the other user devices 12-2 through 12-N-1 (not shown) such that the synchronization process is performed the manner discussed above with respect to FIGS. 7, 8A through 8C, 9A, and 9B. Alternatively, the secondary device 90 may not be one of the other user devices 12-2 through 12-N-1, in which case the synchronization process may be a typical synchronization process performed via a direct wired connection (e.g., Universal Serial Bus, Firewire, or the like) or a direct local wireless connection (e.g., IEEE 802.11x, Bluetooth, or the like). For example, if the user device 12-N is an Apple® iPhone®, the synchronization process may be a traditional synchronization process between the Apple® iPhone® and the secondary device 90 (e.g., a personal computer). Once the selected media item is obtained by the user device 12-N, the aggregation function 20-N of the user device 12-N shares the selected media item with the user device 12-1 (step 606). For example, if the selected media item is selected for caching, the aggregation function 20-N of the user device 12-N may push the selected media item to the user device 12-1 for caching. As another example, the aggregation function 20-N of the user device 12-N may notify the user device 12-1 that the selected media item is not available and provide the selected media item to the user device 12-1 upon request.

As an exemplary use case of the bridging process, the user devices 12-1 and 12-N may participate in the media sharing system 10 at a work environment of the users 14-1 and 14-N. While interacting over the LAN 16 in their work environment, the song "You Get What You Give" is selected, and the user device 12-1 sends a request for the song "You Get What You Give" to the user device 12-N. That evening, while the user 14-N and the user device 12-N are in a home environment of the user 14-N in which the secondary device 90 is located, the user device 12-N obtains the song "You Get What You Give" from the secondary device 90 during a synchronization process. The next day when the users 14-1 and 14-N, along with their respective user devices 12-1 and 12-N, are back in their work environment, the song "You Get What You Give" is stored on the user device 12-N and available for sharing with the user 14-1 at the user device 12-1.

Figure 14A:
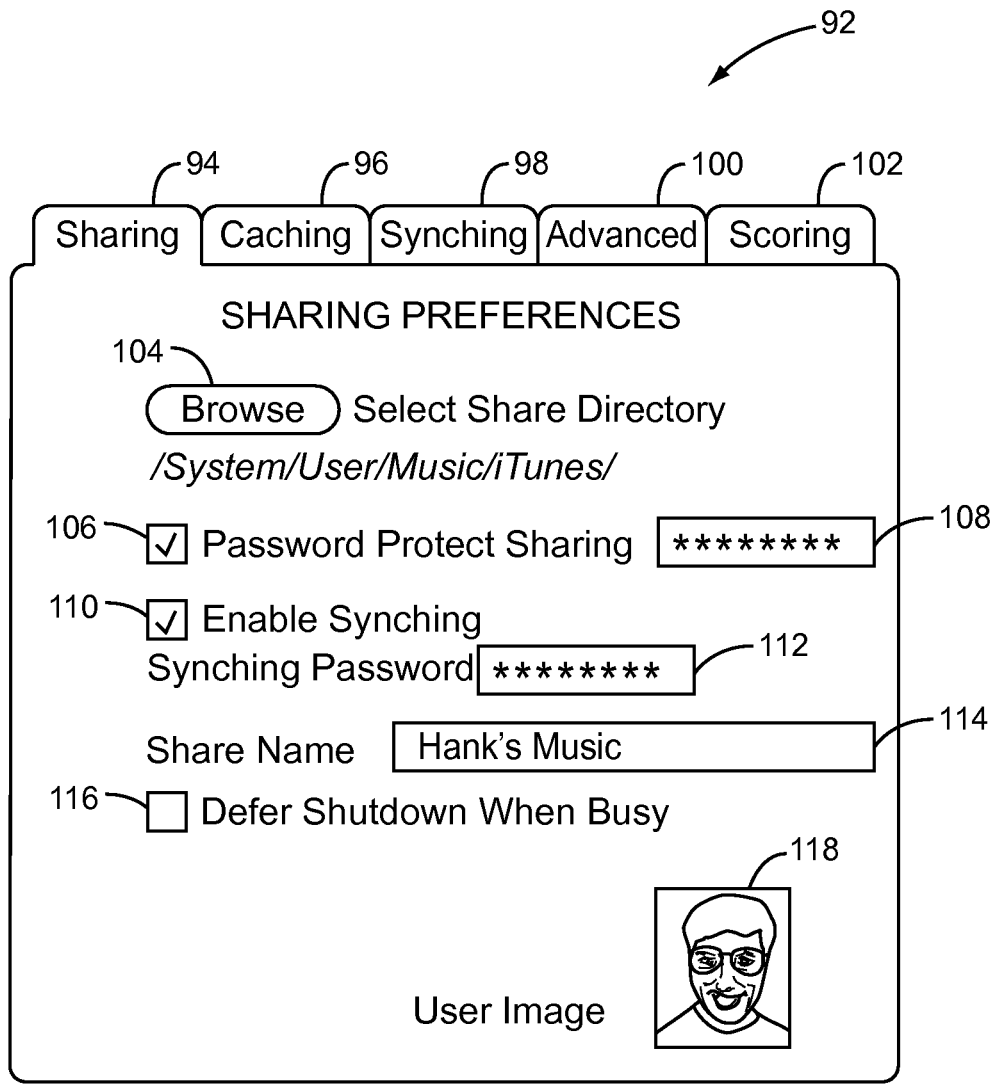
FIGS. 14A through 14E illustrate an exemplary GUI enabling a user to configure his media player and aggregation function as well as to define preferences utilized by the media player and/or aggregation function according to one embodiment of the present invention.

FIGS. 14A through 14E illustrate an exemplary GUI 92 enabling, for example, the user 14-1 to configure his media player function 18-1 as well as to define a number of user preferences according to one embodiment of the present invention. As illustrated in FIG. 14A, the GUI 92 includes a number of tabs, which include a sharing tab 94, a caching tab 96, a synching tab 98, an advanced tab 100, and a scoring tab

102. In FIG. 14A, the sharing tab 94 is selected. As such, the user 14-1 is enabled to define a number of sharing preferences. More specifically, in this example, via a browse button 104, the user 14-1 is enabled to select a directory in which his shared media collection is located. By selecting a check box 106 and entering a password in password field 108, the user 14-1 activates password protection for his shared media collection. The other users 14-2 through 14-N are required to enter the password before accessing the shared media collection of the user 14-1. The other users 14-2 through 14-N may be required to enter the password before aggregation is performed. Alternatively, the other users 14-2 through 14-N may be enabled to select the shared media collection of the user 14-1 for aggregation but may be required to enter the password once before accessing media items from the shared media collection for playback.

The user 14-1 may also enable synching by selecting check box 110 and entering a synching password in synching password field 112. By enabling synching, the user 14-1 enables other user devices of the user devices 12-2 through 12-N to obtain media items from the user device 12-1 using the synching process discussed above with respect to FIGS. 7, 8A through 8C, 9A, and 9B. In this example, the sharing preferences also include a share name, which is entered in a share name field 114. In addition, by selecting check box 116, the user 14-1 may choose to defer shutdown of the media player function 18-1 when the media player function 18-1 is busy delivering media items from the shared media collection to one or more of the other user devices 12-2 through 12-N. Lastly, the sharing preferences include an image 118 of the user 14-1.

Figure 14B:
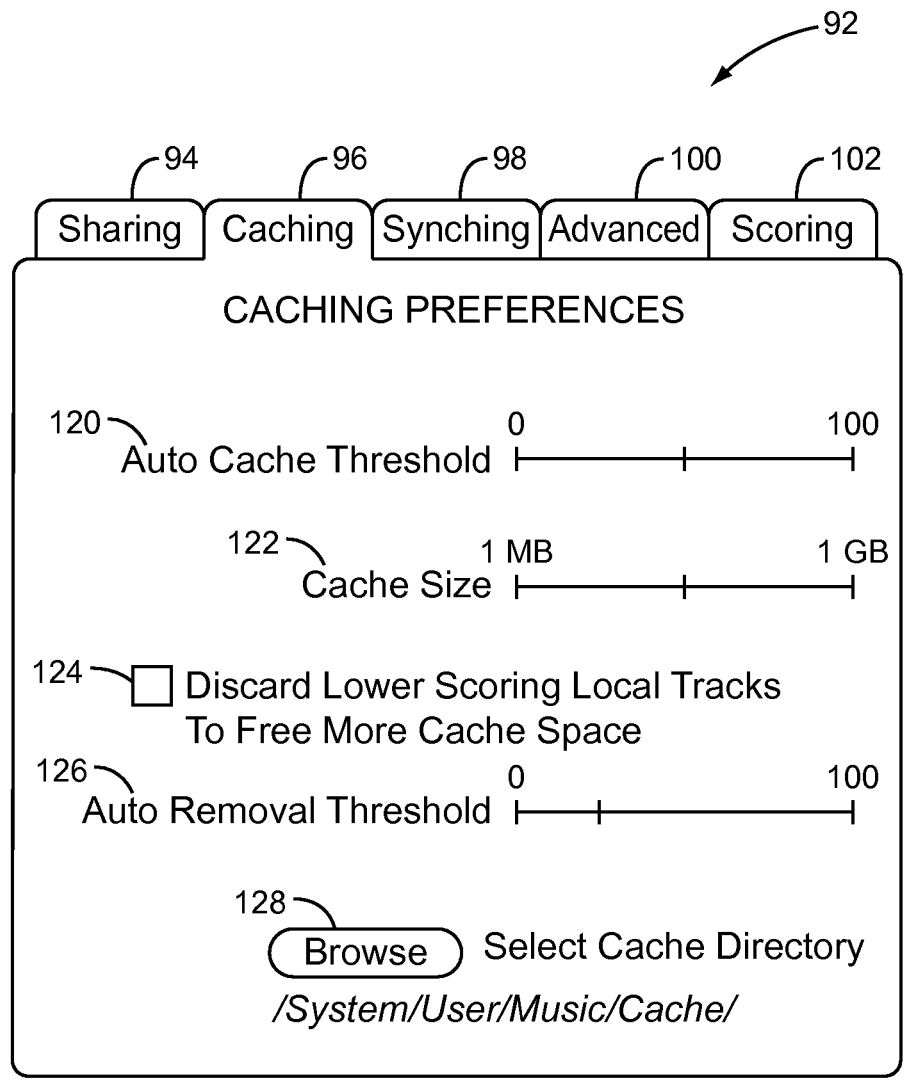

In FIG. 14B, the caching tab 96 is selected. As such, the user 14-1 is enabled to define a number of caching preferences. In this example, the caching preferences include an auto-cache threshold 120. As discussed above, using the auto-caching/synching process of FIG. 9, the media items scored above the auto-cache threshold 120 are automatically cached. In this example, the auto-cache threshold 120 is also used as the auto-synching threshold. The caching preferences also include a cache size 122. The cache size 122 defines the size of the cache 26-1 used for storing cached media items. The user 14-1 may enable automatic removal of cached media items by selecting check box 124 and defining an auto-removal threshold 126. Lastly, the user 14-1 may define a cache directory via a browse button 128.

Figure 14C:
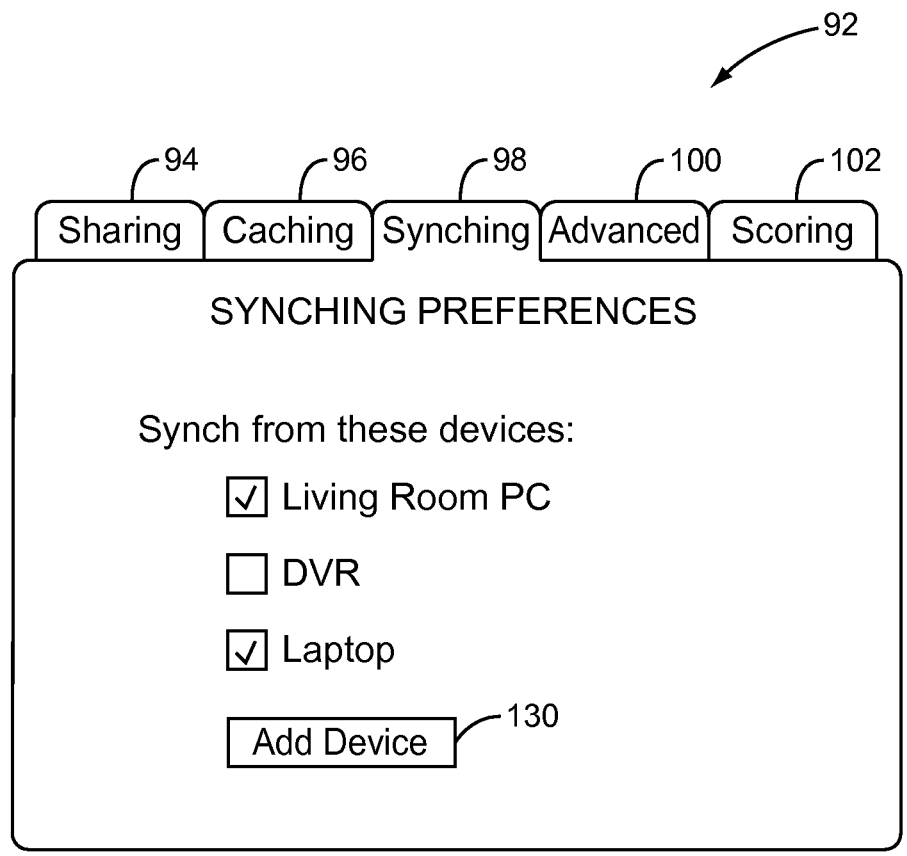

In FIG. 14C, the synching tab 98 is selected. As such, the user 14-1 is enabled to define a number of synching preferences. In this example, the synching preferences include a list of user devices from which the user device 12-1 is to synch. In this example, the list of user devices from which the user device 12-1 is to synch includes user devices referenced as "Living Room PC" and "Laptop." However, rather than referring to the user devices, the shared media collection identifiers may be used. When the shared media collections of the "Living Room PC" and the "Laptop" are available, in the preferred embodiment, the shared media collections appear as available shared media collections in the GUI 28. The user 14-1 may then choose to select these shared media collections for aggregation if desired. Once selected, the user 14-1 enters the required synching passwords for those devices. Then, the synching process described above with respect to FIGS. 7, 8A through 8C, 9A, and 9B may be used to synch desired media items from the selected devices to the user device 12-1. The user 14-1 may add a new device with which to synch via an add device button 130. For example, upon selecting the add device button 130, the user 14-1 may be presented with a list of devices currently available via the LAN 16 (FIG. 1). The user 14-1 may then select one or more of the devices for synching.

Figure 14D:
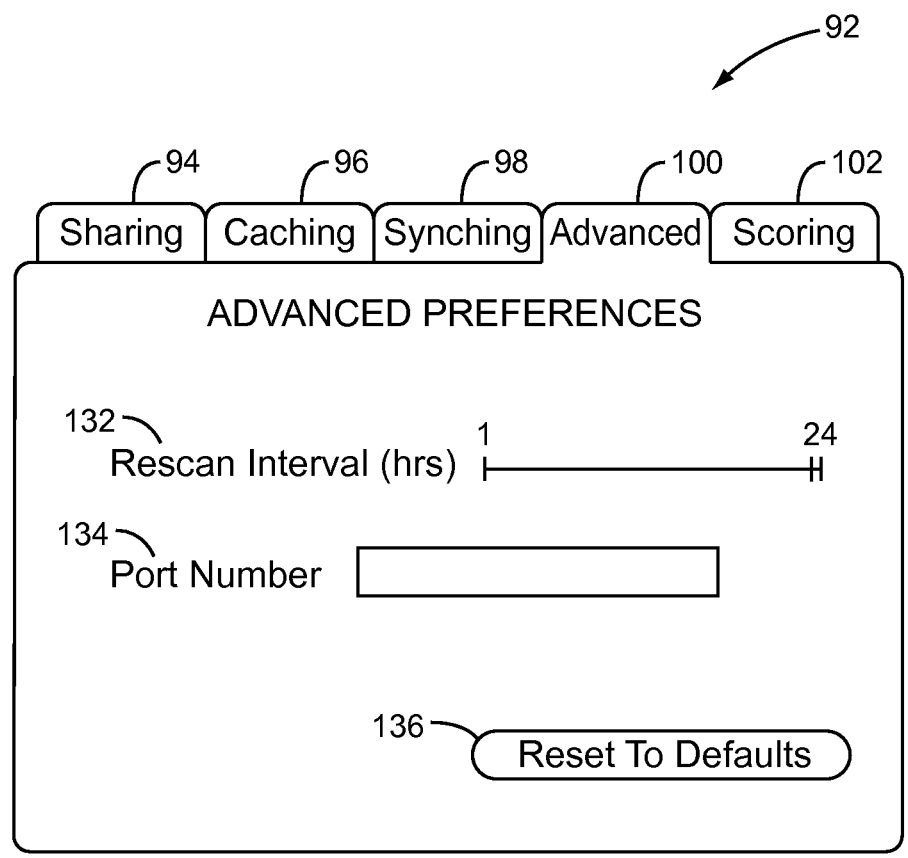

In FIG. 14D, the advanced tab 100 is selected. As such, the user 14-1 is enabled to define a number of advanced preferences. In this example, the advanced preferences include a rescan interval 132 and a port number 134. The rescan interval 132 defines a number of hours between scans by the aggregation function 20-1 for new shared media collections or updates to existing shared media collections. The port number 134 defines the port used by the media player function 18-1. A reset button 136 may be activated by the user 14-1 to reset the rescan interval 132 and port number 134 to default values.

Figure 14E:
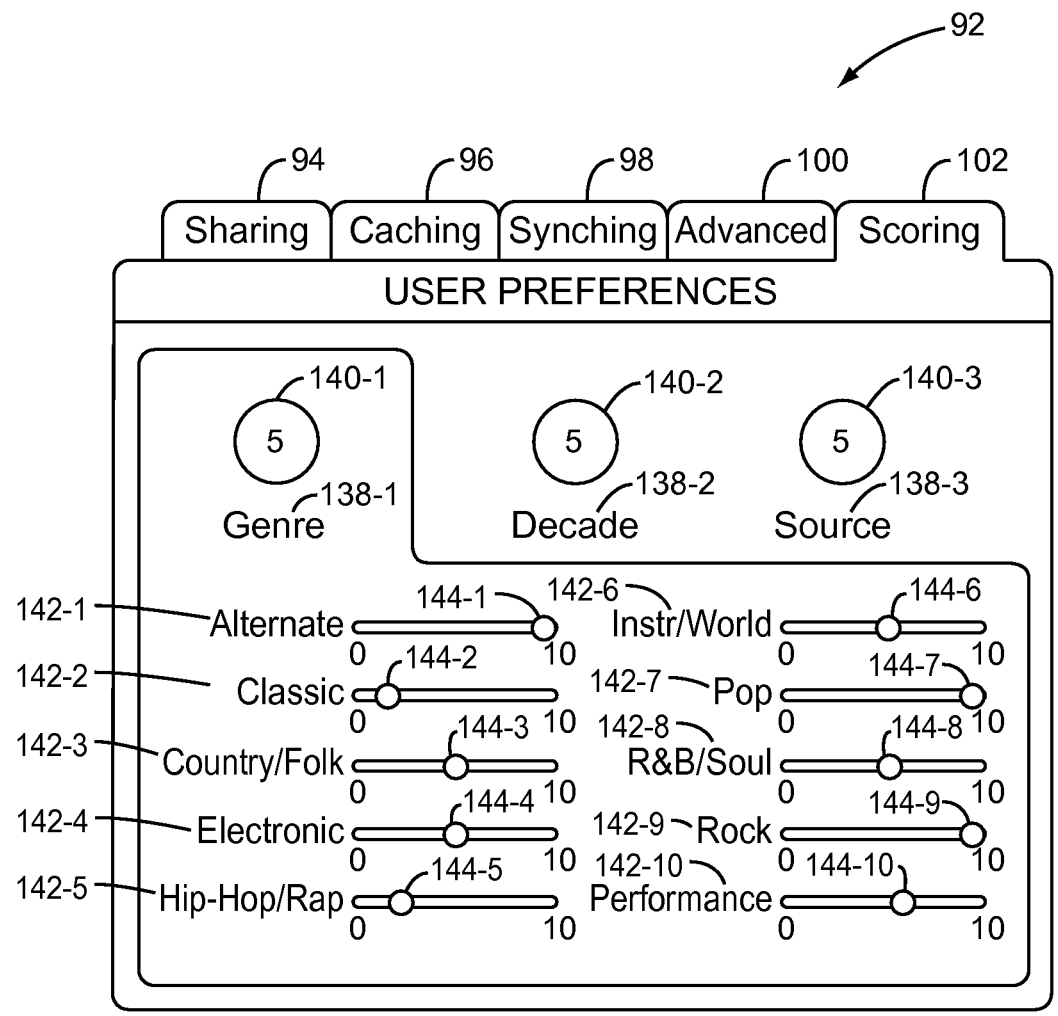

In FIG. 14E, the scoring tab 102 is selected. As such, the user 14-1 is enabled to define a number of user preferences used for scoring media items as discussed above. In this example, the user preferences include a number of media item categories 138-1 through 138-3. The user 14-1 assigns weights to the corresponding media item categories via associated controls 140-1 through 140-3. In addition, for each of the media item categories 138-1 through 138-3, the user 14-1 assigns weights to a number of media item attributes. Thus, in this example, for the genre category 138-1, the user 14-1 assigns weights to a number of genres 142-1 through 142-10 via associated controls 146-1 through 146-10. In a similar manner, the user 14-1 assigns weights to a number of attributes for each of the other media item categories 138-2 through 138-3. More specifically, for the decade category 138-2, the user 14-1 assigns weights to a number of decades. For the source category 138-3, the user 14-1 assigns weights to a number of known sources, which include the currently available shared media collections and, optionally, previously shared media collections. Alternatively, the sources may be referred to by device or user identifiers rather than shared media collection identifiers.

Note that in addition to the preferences and settings discussed with respect to FIGS. 14A through 14E and elsewhere in this disclosure, additional settings may be system-defined or user-defined. More specifically, a maximum number of outgoing connections, a maximum number of incoming connections, a maximum time in cache, a maximum number of playbacks for a cached media item, a setting defining whether cached media items are to be removed upon restart, or the like may be defined. These additional settings may be system-defined and, optionally, configurable by an operator of the media sharing system 10. Further, if system-defined, these additional settings may be global in that they are applied to all of the user devices 12-1 through 12-N or independently defined for each of the user devices 12-1 through 12-N. Alternatively, these additional settings may be defined by the users 14-1 through 14-N. As yet another alternative, some of these additional settings may be system-defined while others are user-defined.

Figure 15:
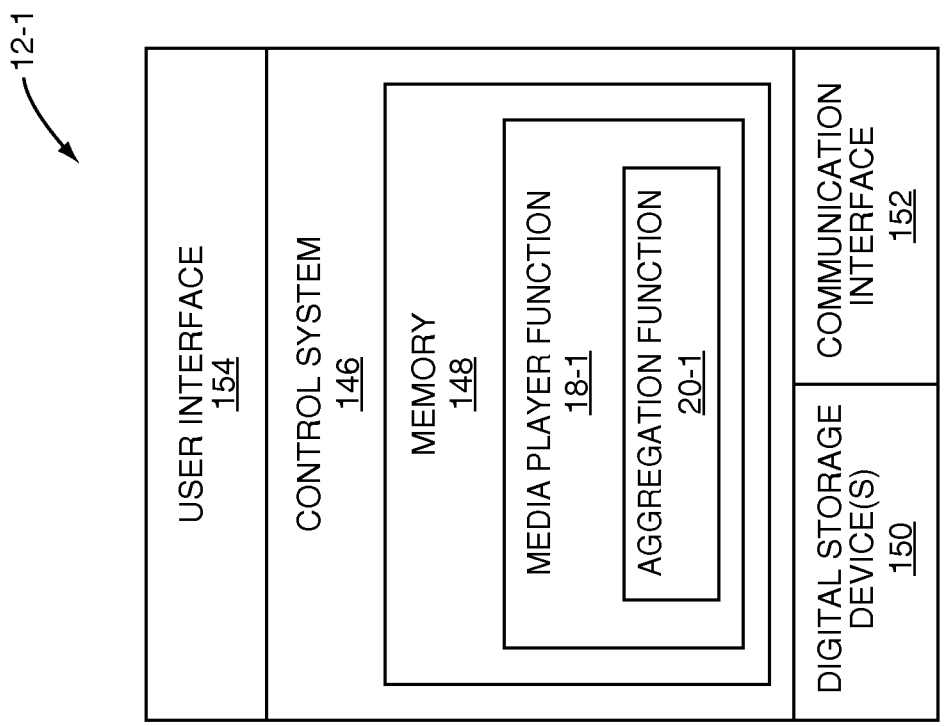
FIG. 15 is a block diagram of an exemplary embodiment of one of the user devices of FIG. 1.

FIG. 15 is a block diagram of an exemplary embodiment of the user device 12-1 of FIG. 1. This discussion is equally applicable to the other user devices 12-2 through 12-N. In general, the user device 12-1 includes a control system 146 having associated memory 148. In this example, the media player function 18-1, including the aggregation function 20-1, is implemented in software and stored in the memory 148. However, the present invention is not limited thereto. The media player function 18-1, including the aggregation function 20-1, may be implemented in software, hardware, or a combination thereof. The user device 12-1 also includes one or more digital storage devices 150 such as, for example, one or more hard disk drives or the like. In one embodiment, the local media collection 22-1 and the aggregate media collection 24-1 are stored in the one or more digital storage devices 150. In addition, some amount of the storage capacity of the one or more digital storage devices 150 may be allocated or used as the cache 26-1. However, the present invention is not limited thereto. The user device 12-1 also includes a communication interface 152 communicatively coupling the user device 12-1 to the LAN 16. The communication interface 152 may be a wired or wireless connection. For example, the communication interface 152 may be an Ethernet connection, an IEEE 802.11x connection, or the like. The communication interface 152 or a second wired or wireless communication interface may be used to connect to a secondary device for a typical synchronization process, as discussed above. The user device 12-1 also includes a user interface 154, which may include components such as, but not limited to, one or more user input devices, a display, a speaker, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operation of a user device of a user comprising:
    joining a media sharing system including the user device of the user and one or more other user devices such that one or more shared media collections hosted by the one or more other user devices are available to the user of the user device;
    scoring a plurality of shared media items from the one or more shared media collections;
    identifying a shared media item from the plurality of shared media items that has a score greater than a defined threshold;
    in response to identifying the shared media item having the score greater than the defined threshold, automatically obtaining the shared media item from a second user device of the one or more other user devices hosting one of the one or more shared media collections in which the shared media item is included; and
    storing the shared media item at the user device.

2. The method of claim 1 wherein the second user device is a user device of a second user, and storing the shared media item at the user device comprises storing the shared media item in cache at the user device.

3. The method of claim 2 wherein limited access rights to the shared media item are granted at the user device, and the method further comprises enforcing the limited access rights to the shared media item.

4. The method of claim 3 wherein the limited access rights define a maximum number of playbacks for the shared media item at the user device.

5. The method of claim 3 wherein the limited access rights provide that only a preview of the shared media item can be played at the user device.

6. The method of claim 1 wherein the shared media item is stored in a cache of the user device, and the method further comprises repeating the steps of identifying a shared media item from the plurality of shared media items that has a score greater than the defined threshold, automatically obtaining the shared media item from a second user device of the one or more other user devices hosting a one of the one or more shared media collections in which the shared media item is included, and storing the shared media item in the cache of the user device.

7. The method of claim 6 wherein storing the shared media item in the cache of the user device comprises:
    making a determination as to whether there is room for the shared media item in the cache;
    if the determination is made that there is not room for the shared media item in the cache:
        identifying at least one shared media item stored in the cache that has a score that is less than an auto-removal threshold;
        removing the at least one shared media item from the cache; and
        storing the shared media item in the cache; and
    if the determination is made that there is room for the shared media item in the cache, storing the shared media item in the cache.

8. The method of claim 6 further comprising:
    identifying a shared media item in the cache at the user device that is scored less than an auto-removal threshold; and
    automatically removing the shared media item from the cache.

9. The method of claim 1 wherein the second user device is associated with the user of the user device, and the one of the one or more shared media collections in which the shared media item is included is a media collection of the user of the user device that is hosted by the second user device.

10. The method of claim 9 wherein the user has unlimited access rights to the shared media item at the user device.

11. The method of claim 1 wherein scoring the plurality of shared media items from the one or more shared media collections comprises scoring the plurality of shared media items based on user preferences of the user of the user device.

12. The method of claim 1 further comprising:
    aggregating at least two media collections comprising at least one shared media collection from the one or more shared media collections to provide an aggregate media collection of the user, the aggregate media collection comprising a list of unique media items in the at least two media collections;
    wherein scoring the plurality of shared media items comprises scoring at least a subset of the list of unique media items.

13. A computer readable medium comprising software for instructing a user device of a user to:
    join a media sharing system including the user device of the user and one or more other user devices such that one or more shared media collections hosted by the one or more other user devices are available to the user of the user device;
    score a plurality of shared media items from the one or more shared media collections;
    identify a shared media item from the plurality of shared media items that has a score greater than a defined threshold;
    in response to identifying the shared media item having the score greater than the defined threshold, automatically obtain the shared media item from a second user device of the one or more other user devices hosting one of the one or more shared media collections in which the shared media item is included; and
    store the shared media item at the user device.

14. The computer readable medium of claim 13 wherein the second user device is a user device of a second user, and the shared media item is stored in cache at the user device.

15. The computer readable medium of claim 14 wherein limited access rights to the shared media item are granted at the user device, and the software is further adapted to instruct the user device to enforce the limited access rights to the shared media item.

16. The computer readable medium of claim 15 wherein the limited access rights define a maximum number of playbacks for the shared media item at the user device.

17. The computer readable medium of claim 15 wherein the limited access rights provide that only a preview of the shared media item can be played at the user device.

18. The computer readable medium of claim 13 wherein the shared media item is stored in a cache of the user device, and the software is further adapted to instruct the user device to repeatedly identify a shared media item from the plurality of shared media items that has a score greater than the defined threshold, automatically obtain the shared media item from a second user device of the one or more other user devices hosting a one of the one or more shared media collections in which the shared media item is included, and store the shared media item in the cache of the user device.

19. The computer readable medium of claim 18 wherein in order to store the shared media item in the cache of the user device, the software is further adapted in instruct the user device to:
  make a determination as to whether there is room for the shared media item in the cache;
  if the determination is made that there is not room for the shared media item in the cache:
    identify at least one shared media item stored in the cache that has a score that is less than an auto-removal threshold;
    remove the at least one shared media item from the cache; and
    store the shared media item in the cache; and
  if the determination is made that there is room for the shared media item in the cache, store the shared media item in the cache.

20. The computer readable medium of claim 18 further comprising:
  identifying a shared media item in the cache at the user device that is scored less than an auto-removal threshold; and
  automatically removing the shared media item from the cache.

21. The computer readable medium of claim 13 wherein the second user device is associated with the user of the user device, and the one of the one or more shared media collections in which the shared media item is included is a media collection of the user of the user device that is hosted by the second user device.

22. The computer readable medium of claim 21 wherein the user has unlimited access rights to the shared media item at the user device.

23. The computer readable medium of claim 13 wherein the plurality of shared media items are scored based on user preferences of the user of the user device.

24. The computer readable medium of claim 13 wherein the software is further adapted to instruct the user device to:
  aggregate at least two media collections comprising at least one shared media collection from the one or more shared media collections to provide an aggregate media collection of the user, the aggregate media collection comprising a list of unique media items in the at least two media collections;
  wherein the plurality of shared media items scored comprise at least a subset of the list of unique media items.

25. A user device of a user comprising:
  a communication interface communicatively coupling the user device to a network; and
  a control system associated with the communication interface and adapted to:
    join a media sharing system including the user device of the user and one or more other user devices connected via the network such that one or more shared media collections hosted by the one or more other user devices are available to the user of the user device;
    score a plurality of shared media items from the one or more shared media collections;
    identify a shared media item from the plurality of shared media items that has a score greater than a defined threshold;
    in response to identifying the shared media item having the score greater than the defined threshold, automatically obtain the shared media item from a second user device of the one or more other user devices hosting one of the one or more shared media collections in which the shared media item is included; and
    store the shared media item at the user device.

* * * * *